(12) United States Patent
Boys et al.

(10) Patent No.: US 12,131,865 B2
(45) Date of Patent: *Oct. 29, 2024

(54) INDUCTIVE POWER TRANSFER APPARATUS

(71) Applicant: Auckland Uniservices Limited, Auckland (NZ)

(72) Inventors: John Talbot Boys, Auckland (NZ); Grant Anthony Covic, Auckland (NZ); Mickel Bipin Budhia, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 18/462,041

(22) Filed: Sep. 6, 2023

(65) Prior Publication Data
US 2024/0087806 A1 Mar. 14, 2024

Related U.S. Application Data

(63) Continuation of application No. 16/728,253, filed on Dec. 27, 2019, now Pat. No. 11,804,330, which is a (Continued)

(30) Foreign Application Priority Data

Aug. 5, 2010 (NZ) ........................................ 587222

(51) Int. Cl.
*H02J 50/90* (2016.01)
*B60L 53/126* (2019.01)
(Continued)

(52) U.S. Cl.
CPC ............ *H01F 38/14* (2013.01); *B60L 53/126* (2019.02); *H02J 50/10* (2016.02); *H02J 50/12* (2016.02);
(Continued)

(58) Field of Classification Search
None
See application file for complete search history.

(56) References Cited

U.S. PATENT DOCUMENTS 6,906,495 B2 6/2005 Cheng
7,174,024 B1 2/2007 Suzuki et al.
(Continued)

FOREIGN PATENT DOCUMENTS

KR 100928439 B1 11/2009
WO 2007/090168 A2 8/2007
(Continued)

OTHER PUBLICATIONS

Peter Cawley and M.U.S. Lowe, "An EMAT Array for the Rapid Inspection of Large Structures Using Guided Waves," Feb. 2004, vol. 9, No. 02, (pp. 1-8.).

*Primary Examiner* — Daniel Kessie
(74) *Attorney, Agent, or Firm* — Edell, Shapiro & Finnan, LLC

(57) ABSTRACT

An IPT system magnetic flux pad includes two substantially planar coils (17) in close proximity to each other above a magnetically permeable core (14). The coils (17) each define a pole area (11, 12) and the distance between one or more adjacent turns of the coils (17) located in a region between the pole areas (11, 12) being different from the distance between one or more adjacent turns of the coils (17) located outside the region between the pole areas (11, 12).

20 Claims, 27 Drawing Sheets

Related U.S. Application Data continuation of application No. 13/814,415, filed as application No. PCT/NZ2011/000153 on Aug. 5, 2011, now abandoned.

(51) Int. Cl.
    *H01F 38/14*     (2006.01)
    *H02J 50/10*     (2016.01)
    *H02J 50/12*     (2016.01)
    *H02J 50/70*     (2016.01)

(52) U.S. Cl.
    CPC .............. *H02J 50/70* (2016.02); *H02J 50/90* (2016.02); *Y02T 10/70* (2013.01); *Y02T 10/7072* (2013.01); *Y02T 90/12* (2013.01); *Y02T 90/14* (2013.01)

(56) References Cited

U.S. PATENT DOCUMENTS

| | | |
|---|---|---|
| 7,406,873 B2 | 8/2008 | Piage |
| 8,543,190 B2 | 9/2013 | Wasson et al. |
| 2003/0003903 A1 | 1/2003 | Becken |
| 2005/0284817 A1 | 12/2005 | Fernandez et al. |
| 2008/0224656 A1 | 9/2008 | Schulz |
| 2012/0098486 A1 | 4/2012 | Jung |

FOREIGN PATENT DOCUMENTS

| | | |
|---|---|---|
| WO | 2008/140333 A2 | 11/2008 |
| WO | 2010/090539 A1 | 8/2010 |

(Original – No ferrite under ends)

(Original with ferrite under ends)

(End winding at 9.1mm centres, gap at end of flux pipe)

(End winding at 9.1mm centres, gap at end of flux pipe, with one ferrite removed)

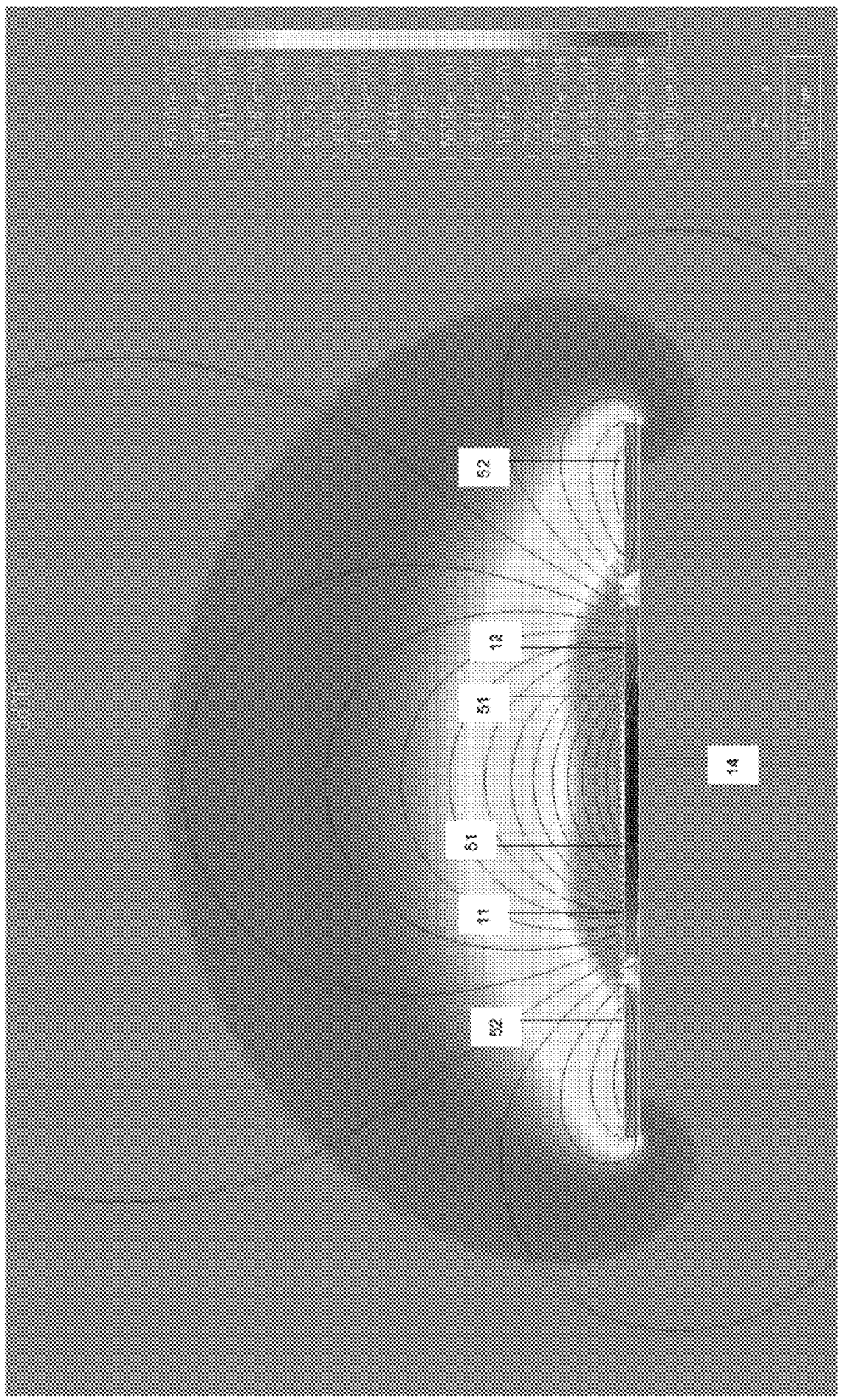

(End winding at 11.8mm centres, NO gap at end of flux pipe, one ferrite removed)

INDUCTIVE POWER TRANSFER APPARATUS

FIELD OF THE INVENTION

This invention relates to apparatus for generating or receiving magnetic flux. The invention has particular, but not sole, application to a low profile, substantially flat device, such as a pad, for power transfer using an Inductive Power Transfer (IPT) system.

BACKGROUND

IPT systems, and the use of a pad including one or more windings that may comprise the primary or secondary windings for inductive power transfer, are introduced in our published international patent application WO 2008/140333, the contents of which are incorporated herein by reference. One particular application of IPT power transfer pads is electric vehicle charging. IPT power transfer pads are used both in the vehicle as a power "pick-up" device (i.e. the secondary side winding of the IPT system), and at a stationary location such as a garage floor as the "charging pad" (i.e. the primary side winding) from which power is sourced.

In the development of pick-ups for inductively charging electric vehicles a problem of some concern is the clearance available under the vehicle. With conventional pick-up circuits power in sufficient quantities can be provided at distances up to perhaps 100 mm. Beyond this distance the coupling factor becomes so small that effective power transfer becomes impractical.

It is generally conceded that the power required to charge a typical electric vehicle overnight is about 2.0-3.5 kW, so that in an overnight charging mode some 24-45 kWH can be transferred. With modern electric vehicles this is enough energy to travel more than 100 km and is ideal for small vehicles used for tasks such as dropping children at schools, running errands, short commutes and the like.

Inductively coupled chargers commonly use two power pads that are circular in shape and may have dimensions of 400 mm diameter by 25 mm thick as shown in FIG. 1. However, to use an inductive charger such as this the vehicle must be positioned relatively accurately over the charging pad—typically within 50 mm of perfect alignment—and the separation (i.e. the vertical clearance) between the power pad on the vehicle and the power pad on the ground must be closely controlled. In principle inductive power transfer may be accomplished for vertical spacings between 0 mm and 100 mm but if the system is set up for 100 mm it will have quite a large reduction in power at 120 mm and may well be inoperable below 50 mm. This state of affairs occurs because both the self inductance and the mutual inductance of the power pads vary widely as the distance between the pads changes. The self inductance and the mutual inductance as a function of the separation for two identical circular pads that have the construction of FIG. 1, are shown in FIG. 2. Thus at 100 mm the power pad receiver or pick-up may have a pick-up voltage of 100 V and a short circuit current of 5.0 A for a power rating of 500 W. If the IPT system electronics operates with a Q factor of 4, then 2 kW can be transferred to the battery though there are still difficulties to overcome in producing the power needed at the appropriate battery voltage.

The induced voltage in the pick-up pad (i.e. the vehicle mounted power pad) is very separation sensitive—corresponding to the variation in mutual inductance shown in FIG. 2—so that at 120 mm it is reduced by approximately 40% while at 50 mm it is increased by a factor of 2. A reduction in power means that the vehicle does not get fully charged in the usual time, but the more challenging situation is that at smaller separations the power transferred may be so high that the components of the circuit are overloaded. Also, as the separation is reduced the self inductance of the pick-up coil also changes so that the circuit operates off-frequency putting extra stress on the power supply. As the separation gets smaller still this stress on the power supply caused by the non-tuned pick-up on the primary side cannot be sustained and the system must be shut down. In practice it is feasible to operate with a separation between 40 and 100 mm but a larger range is too difficult.

A range of separation from 40 to 100 mm is quite small. If the vehicle has a relatively high ground clearance then either the power pad on the vehicle has to be lowered or the power pad on the ground has to be raised. Automatic systems for doing this compromise the reliability of the charging system. Alternatively the pad on the ground can be on a fixed but a raised platform but such a pad is a tripping hazard when a car is not being charged and this situation is generally to be avoided in a garage or other location involving vehicles and pedestrians.

The known power pad construction of FIG. 1 comprises an aluminium case 1 containing typically eight ferrite bars 2 and a coil 3. Current in the coil causes magnetic flux in the ferrite bars and this flux has flux lines that start on the ferrite bars and propagate to the other end of the bar in a path containing the coil before retunring through air in a path that may be thought of as a semi-elliptical shape. The flux lines 4 for a single bar are shown in FIG. 3. The flux lines leave the ferrite in an upward direction and propagate to the other end of the bar, entering it at right angles. No flux goes out the back of the pad as the solid aluminium backing plate 1 prevents it. In the actual pad the eight bars give a flux pattern shown approximately in cross section in FIG. 4. A simulation of the actual flux pattern is shown in FIG. 4A.

From FIG. 4A it can be seen that at the highest point the flux lines are essentially horizontal. Therefore, to get the maximum separation possible between the primary pad and the secondary pad it would be advantageous to detect this horizontal flux. However, the horizontal flux is still relatively close to the pad (extending from the pad approximately one quarter of the diameter of the pad) and there is no horizontal flux at all at the very centre of the power pad. Thus at the very point where maximum flux density would be ideal—the centre—the actual usable horizontal flux component is zero.

SUMMARY

It is an object of the invention to provide an improved apparatus or method for inductive power transfer, or an improved IPT power transfer pad, or to at least provide the public or the industry with a useful alternative.

Accordingly in one aspect the invention broadly provides an IPT system magnetic flux pad for generating or receiving a magnetic flux, the pad comprising two substantially planar coils in close proximity to each other and being magnetically associated with a magnetically permeable core, the coils each defining a pole area and the distance between one or more adjacent turns of the coils located in a region between the pole areas being different from the distance between one or more adjacent turns of the coils located outside the region between the pole areas.

Preferably the distance between one or more adjacent turns of the coils located in a region between the pole areas is less than the distance between one or more adjacent turns of the coils located outside the region between the pole areas.

Alternately the distance between one or more adjacent turns of the coils located in a region between the pole areas is greater than the distance between one or more adjacent turns of the coils located outside the region between the pole areas.

In another aspect the invention broadly provides an IPT system magnetic flux pad for generating or receiving a magnetic flux, the pad comprising two substantially planar coils in close proximity to each other, the coils each defining a pole area, a magnetically permeable core extending between the pole areas whereby one or more turns of the coils located in a region between the pole areas are more closely magnetically associated with the magnetically permeable core than one or more turns of the coils located outside the region between the pole areas.

In another aspect the invention broadly provides an IPT system magnetic flux pad for generating or receiving a magnetic flux, the pad comprising two substantially planar coils in close proximity to each other, the coils each defining a pole area, a magnetically permeable core extending in a longitudinal direction between the pole areas, and wherein the magnetically permeable core is discontinuous in the transverse direction.

Preferably each pole area comprises a centre of a respective coil.

In another aspect the invention broadly provides an IPT system magnetic flux pad for generating or receiving a magnetic flux, the pad comprising two substantially planar coils in close proximity to each other and being associated with a magnetically permeable core, the coils being series wound from a length of wire.

Preferably the length of wire comprises a plurality of lengths provided in parallel.

Preferably the wire comprises litz wire.

Preferably the core comprises a plurality of spaced bars or strips of a magnetically permeable material.

Preferably the magnetically permeable material comprises ferrite.

In another aspect the invention broadly provides a method of constructing an IPT system magnetic flux pad for generating or receiving a magnetic flux, the pad comprising two substantially planar coils in close proximity to each other and being magnetically associated with a magnetically permeable core, the method comprising the steps of:
  determining a required flux at a distance from a front face of the pad;
  varying one or more of:
    a) a dimension of the magnetically permeable core
    b) the distance between one or more adjacent turns of one or more of the coils in a region between the coil centres relative to the distance between one or more adjacent turns of one or more of the coils outside the region between the coil centres to achieve the required flux.

Preferably the step of varying a dimension of the magnetically permeable core includes varying the extent to which the core extends toward or beyond the coil centres.

In another aspect the invention broadly provides a method of constructing an IPT system magnetic flux pad for generating or receiving a magnetic flux, the pad comprising two substantially planar coils in close proximity to each other and being magnetically associated with a magnetically permeable core, the method comprising the steps of: determining a required flux at a distance from one or both ends of the pad; varying one or more of:
  a) a dimension of the magnetically permeable core
  b) the distance between one or more adjacent turns of one or more of the coils in a region between the coil centres relative to the distance between one or more adjacent turns of one or more of the coils outside the region between the coil centres to achieve the required flux.

Preferably the step of varying a dimension of the magnetically permeable core includes varying the extent to which the core extends toward or beyond the coil centres.

In a further aspect the invention broadly provides an IPT system magnetic flux receiver pad comprising two substantially planar coils in close proximity to each other and being magnetically associated with a magnetically permeable core, and a further substantially planar coil overlapping the other two coils.

Preferably windings of the further coil pass through the coil centres of the other two coils.

Preferably the two coils each define a pole area. Preferably windings of the further coil pass through the pole areas.

Preferably the magnetic core of the receiver pad in a direction extending from one pole are to the other is equal to or longer than the magnetic core of a flux transmitter pad in a direction extending form one pole area to the other.

Preferably the coils are wound such that an impedance is reflected onto a flux transmission structure which compensates for a change in the inductance of the transmission structure due to the presence of the receiver pad.

Preferably the coils being wound such that the uncompensated power obtained from the coils is substantially the same around a defined radius of misalignment of the receiver pad with a transmitter pad.

Preferably the further coil has substantially the same number of turns as one of the other two coils.

Preferably partial series compensation is used to compensate for variations in alignment between the receiver pad and a transmitter pad.

Preferably all the coils are parallel tuned for resonance at the frequency at which power is to be transferred inductively to the pad.

Preferably the further coil comprises a quadrature coil.

In a further aspect the invention broadly provides an IPT system magnetic flux receiver pad comprising two substantially planar coils in close proximity to each other and being magnetically associated with a magnetically permeable core, a further substantially planar coil overlapping the other two coils, and the coils being wound such that the uncompensated power obtained from the coils is substantially the same around a defined radius of misalignment of the receiver pad with a transmitter pad.

Preferably the two coils are connected in series.

In a further aspect the invention provides an IPT system having a magnetic flux transmitter pad and a magnetic flux receiver pad for receiving flux from the transmitter pad, each of the pads comprising two substantially planar coils in close proximity to each other, each having a coil centre and being magnetically associated with a magnetically permeable core, the receiver pad having a further substantially planar coil overlapping its other two coils, and the magnetic core of the receiver pad in a direction extending from one coil centre to the other coil centre being equal to or longer than the magnetic core of the flux transmitter pad.

In another aspect the invention broadly provides an IPT system magnetic flux pad for generating a magnetic flux for reception by a flux receiver located at distance D from the pad, the pad comprising two substantially planar coils in close proximity to each other and being magnetically associated with a magnetically permeable core, and wherein the overall width of the coils is substantially twice distance D.

Preferably the coils are spiral wound coils.

Preferably the coils are substantially flat.

Preferably the coils are substantially co-planar.

Preferably each coil substantially defines a pole area.

Preferably flux enters the pad substantially at one of the pole areas and exits the pad substantially at the other pole area.

Preferably the separation distance is measured from the plane in which the coils are provided.

Preferably the core comprises a plurality of spaced lengths of permeable material.

Preferably substantially no magnetic flux escapes from the core between the two pole areas.

Preferably the windings of the coils in between the pole areas are sufficiently close to each other that substantially no flux escapes from the core in the region between the pole areas.

In a further aspect the invention broadly provides an IPT system magnetic flux pad for generating a magnetic flux for reception by a flux receiver, the pad including two substantially planar coils in close proximity to each other and being magnetically associated with a magnetically permeable core, each coil defining a pole area, the core having a length dimension extending in a direction from one pole area to the other pole area and the distance between the pole areas being in the range of substantially 35% to 60% of the length dimension of the core.

Preferably the distance between the pole areas is substantially 40% to 60% of the length dimension of the core.

Preferably the coils are substantially co-planar.

In a further aspect the invention broadly provides a magnetic flux pad for generating or receiving magnetic flux, the pad comprising a magnetically permeable core, and two substantially planar coils in close proximity to each other and being magnetically associated with the core, and wherein the core comprises a plurality of individual lengths of magnetically permeable material, each length extending in a region from one coil to the other coil, and each length having a substantially uniform thickness and being parallel to and spaced from adjacent lengths by a distance which is substantially twice the thickness.

Preferably the coils are substantially co-planar.

Further aspects of the invention will become apparent from the following description.

DRAWING DESCRIPTION

One or more embodiments are described below by way of example with reference to the accompanying drawings, in which.

Figure 12:
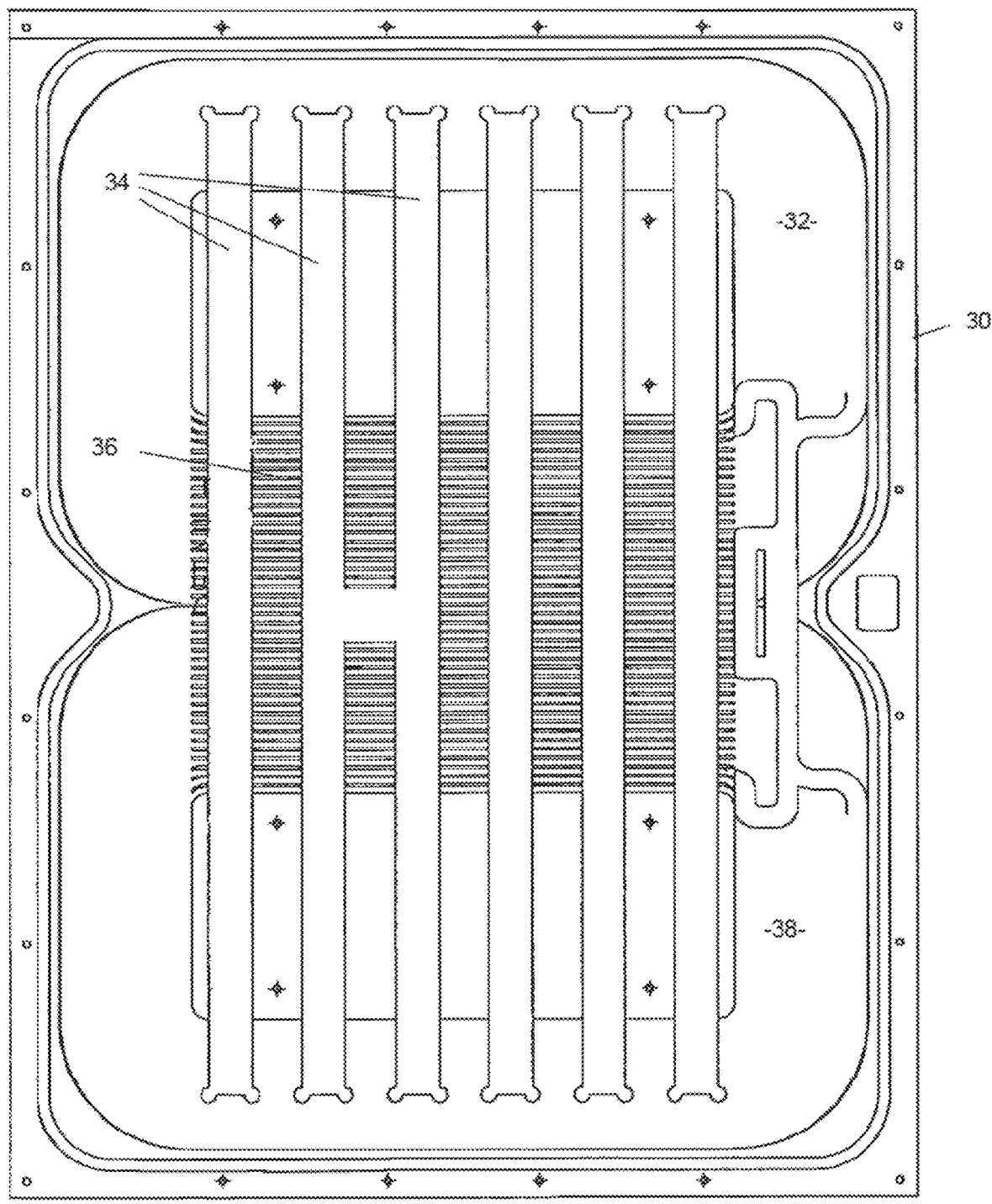
Figure 13:
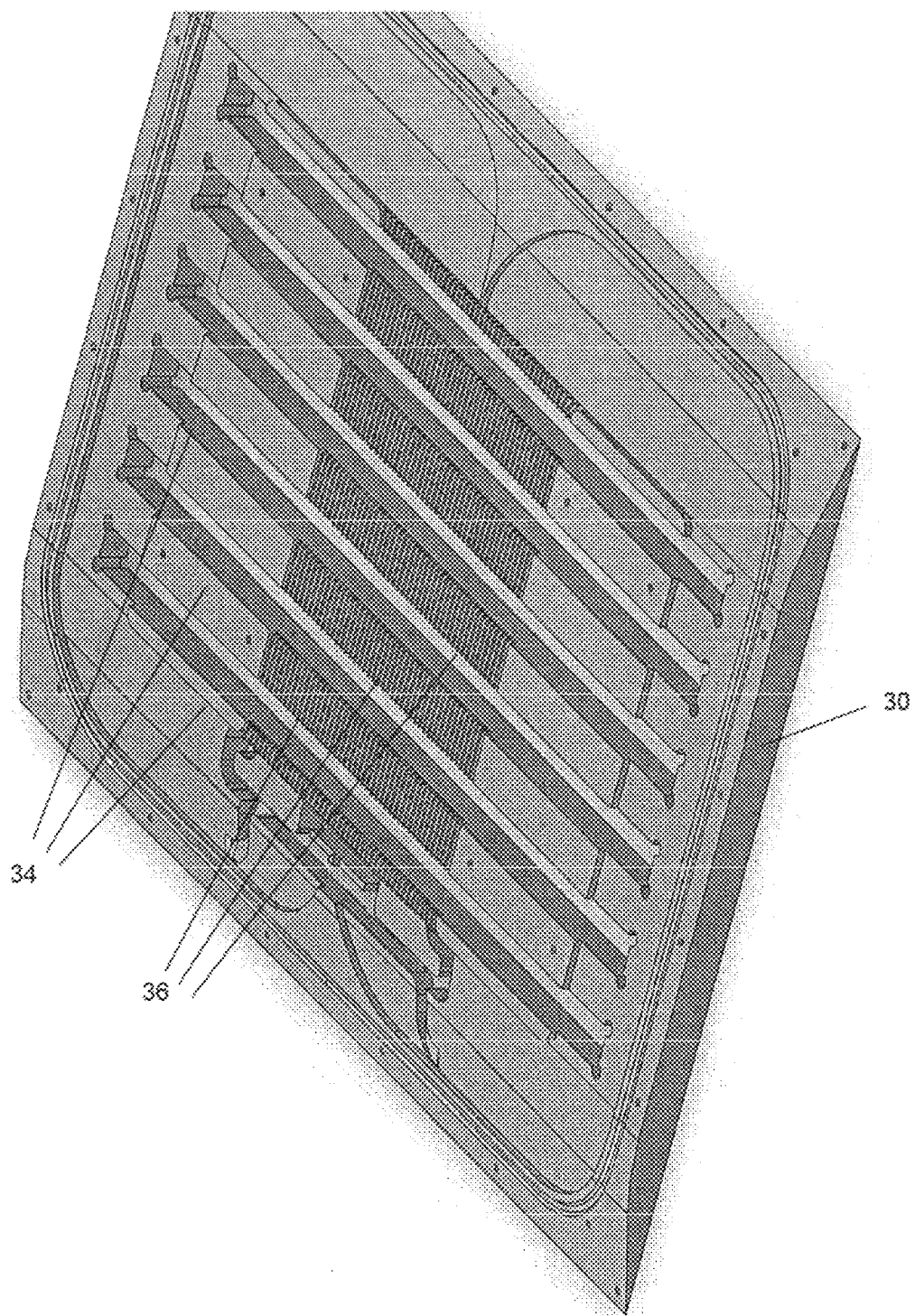
Figure 14:
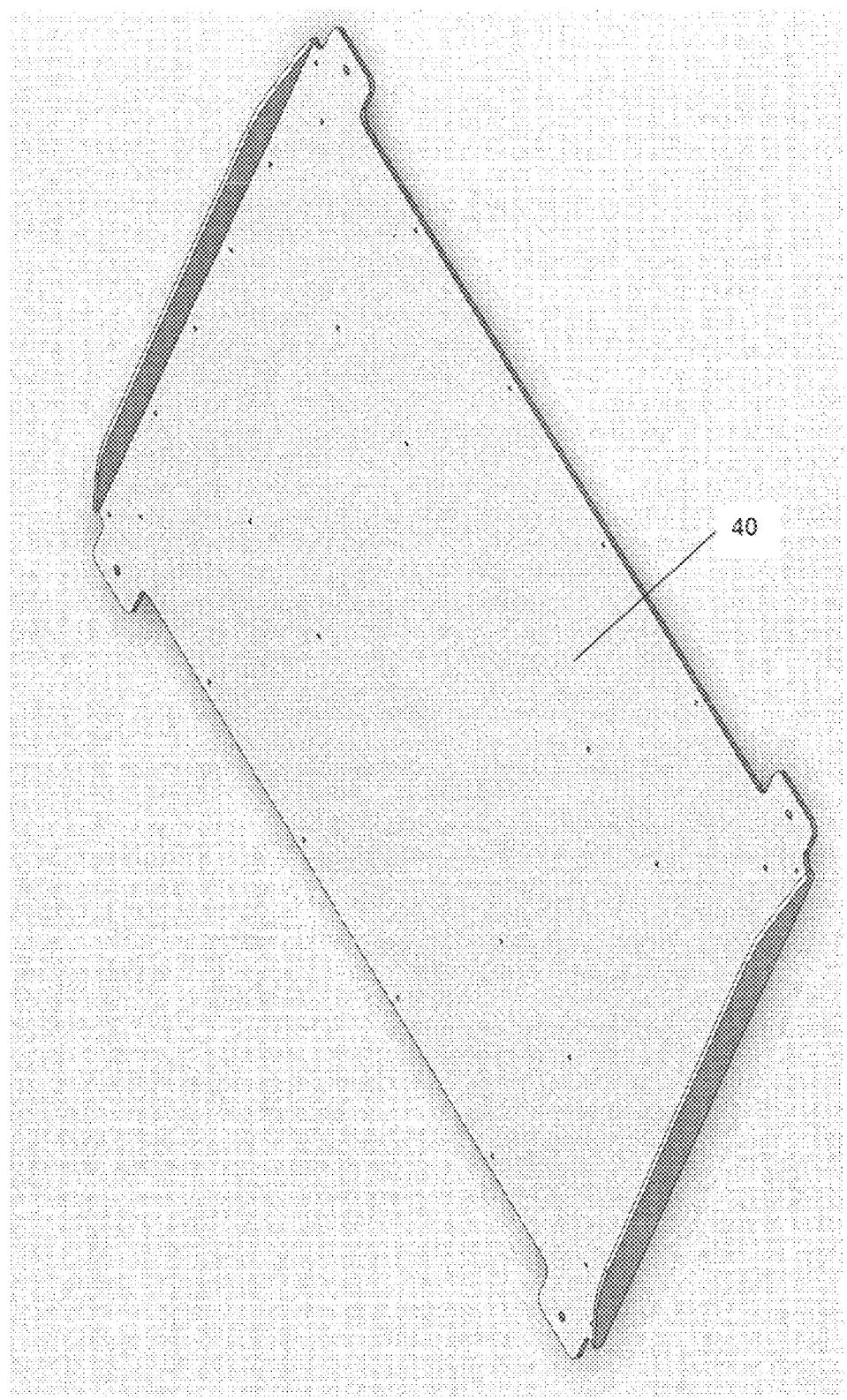

FIGS. 11A-F are two dimensional illustrations of flux patterns produced by pads having different winding and core arrangements;

FIG. 12 is a plan view of a former or support plate for construction of a pad according to the preceding figures;

FIG. 13 is an isometric view of the former of FIG. 12, and;

FIG. 14 is an isometric view of a backing plate adapted for attachment to the rear of the former shown in FIGS. 12 and 13.

Figure 15:
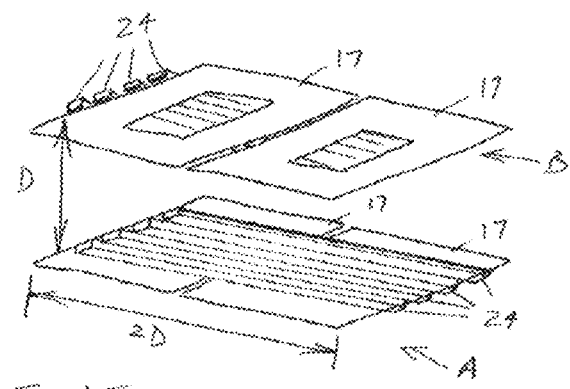

FIG. 15 is an isometric view from below of a flux generating or transmitting pad in a flux receiving pad in accordance with an embodiment of the invention.

Figure 16:
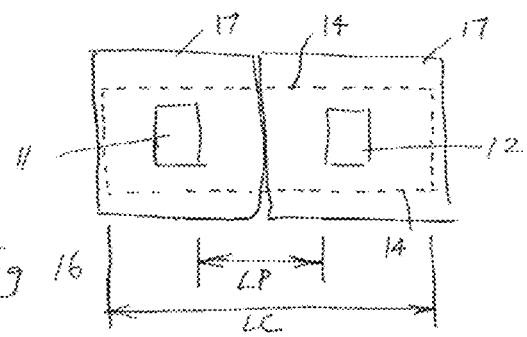
Figure 17:
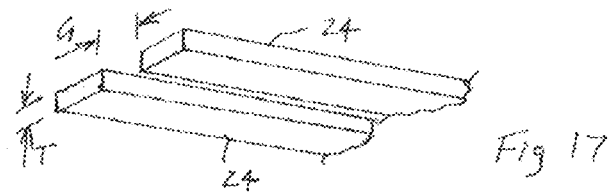

FIG. 16 is a diagrammatic view from above of a flux transmitter pad such as that shown in FIG. 15, FIG. 17 is a partial isometric view of ferrite strips such as those shown in the construction of FIG. 15.

Figure 18A:
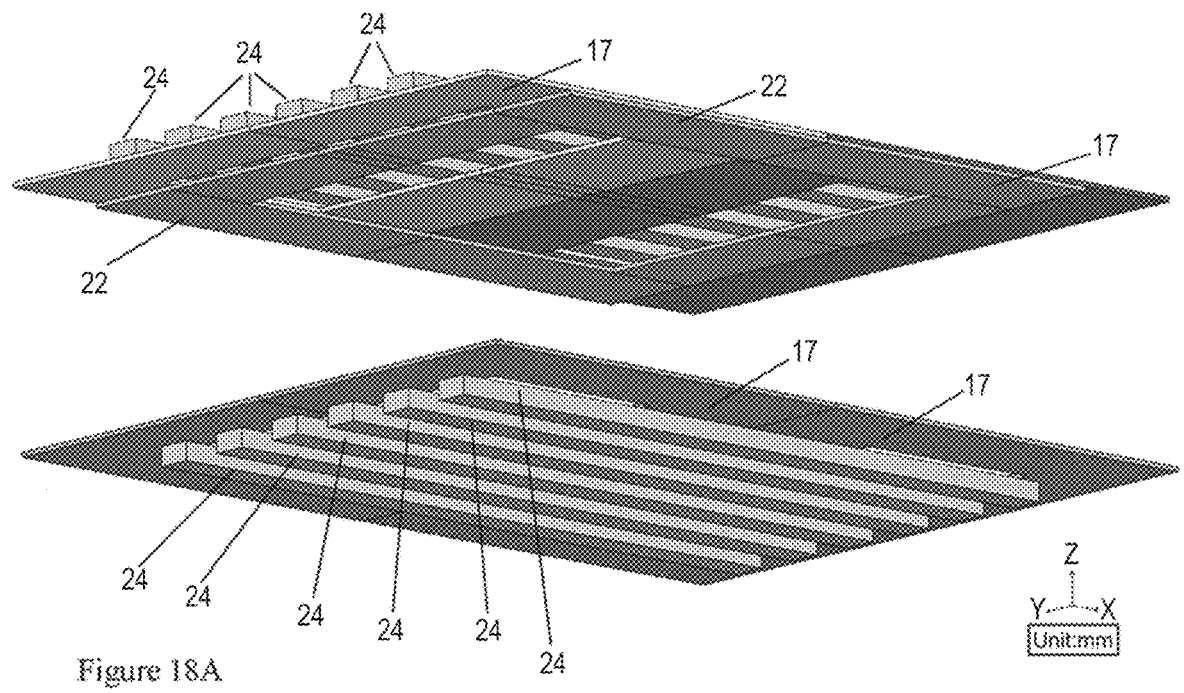
Figure 18B:
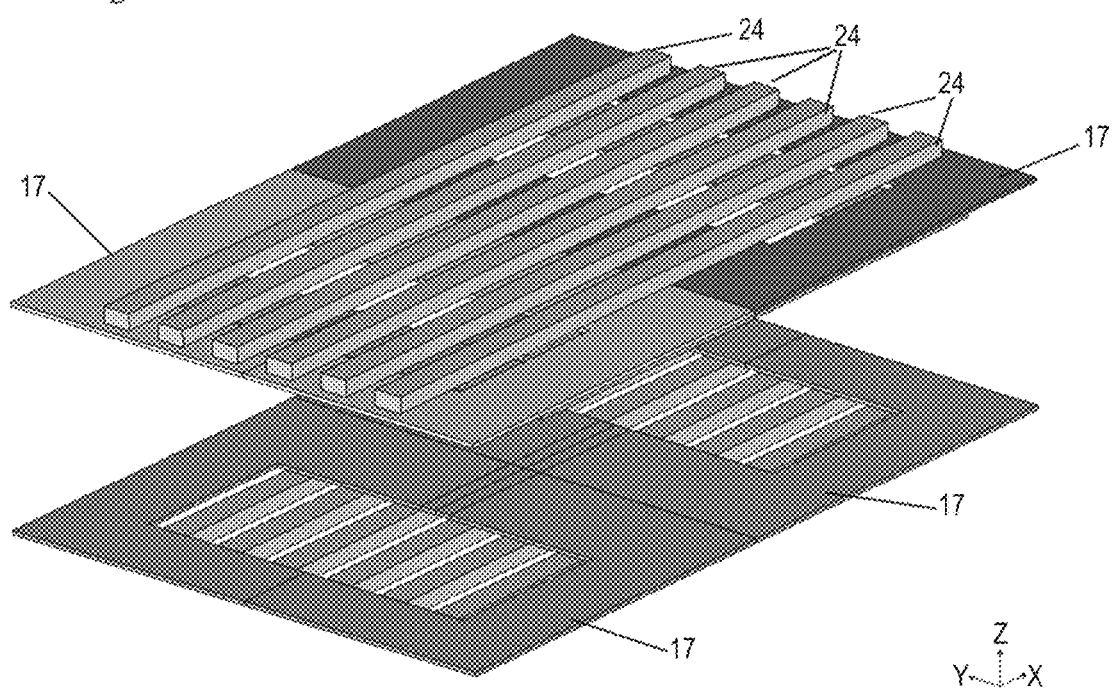

FIGS. 18A and 18B show an isometric view from below and view from above, respectively, of a transmission pad and a receiver pad according to an embodiment of the invention.

Figure 19A:
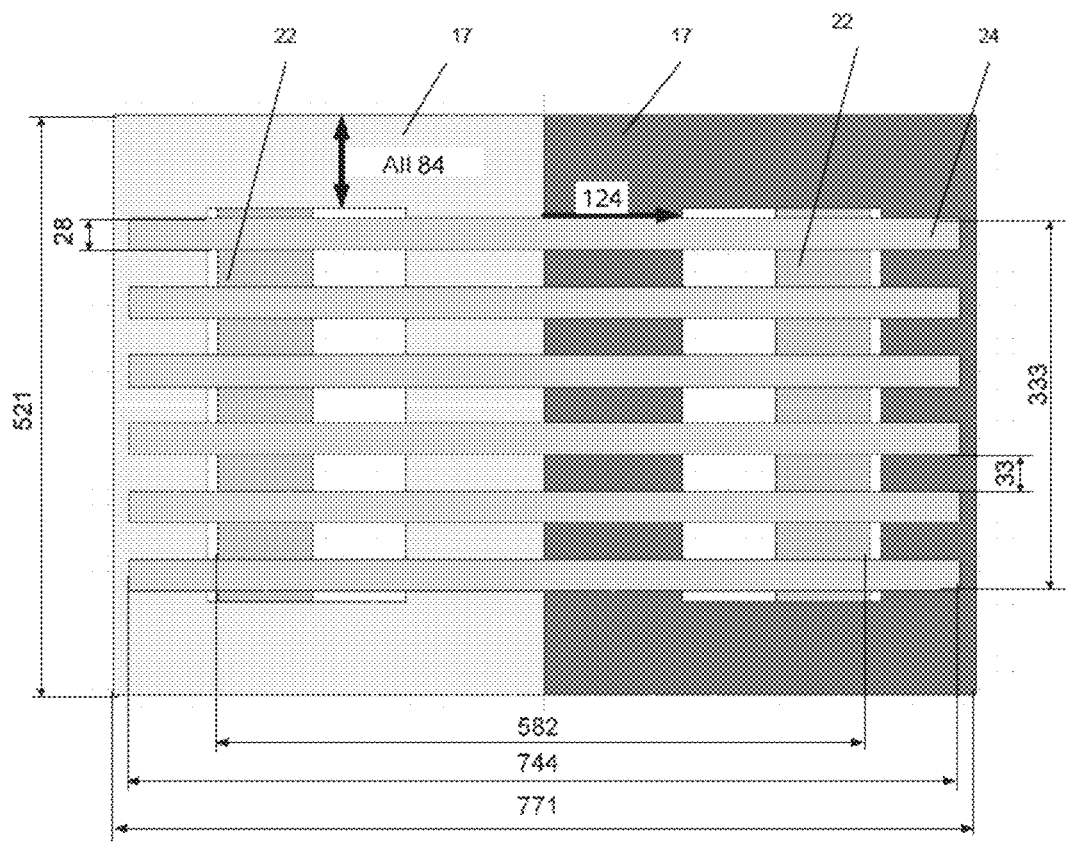
Figure 19B:
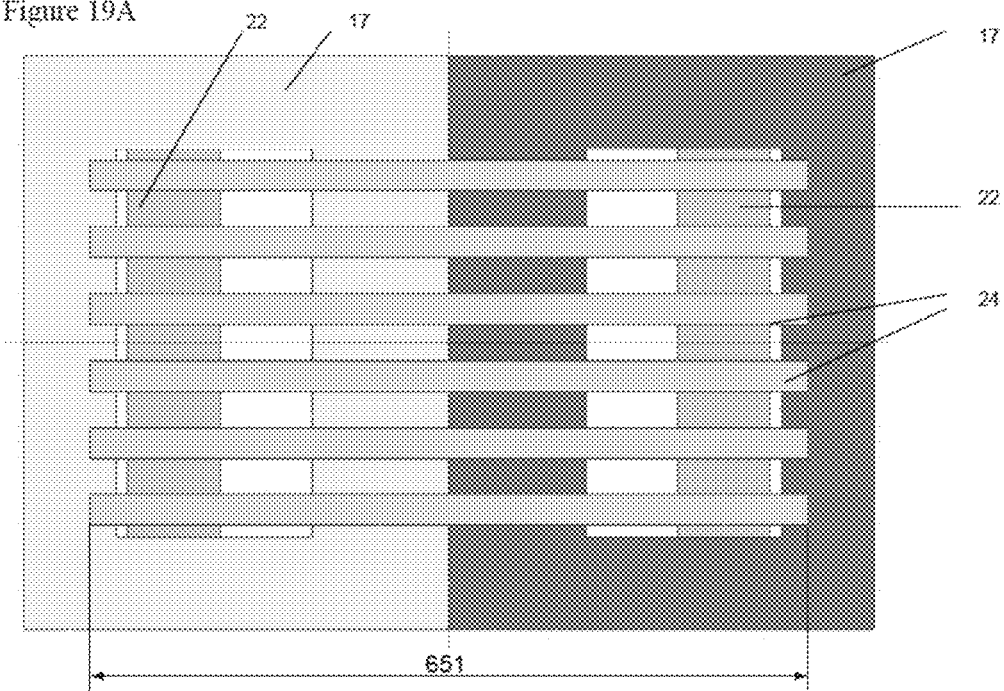

FIGS. 19A and 19B are plan views from above of two embodiments of a receiver pad. The drawings include dimensions for ease of reference.

Figure 19C:
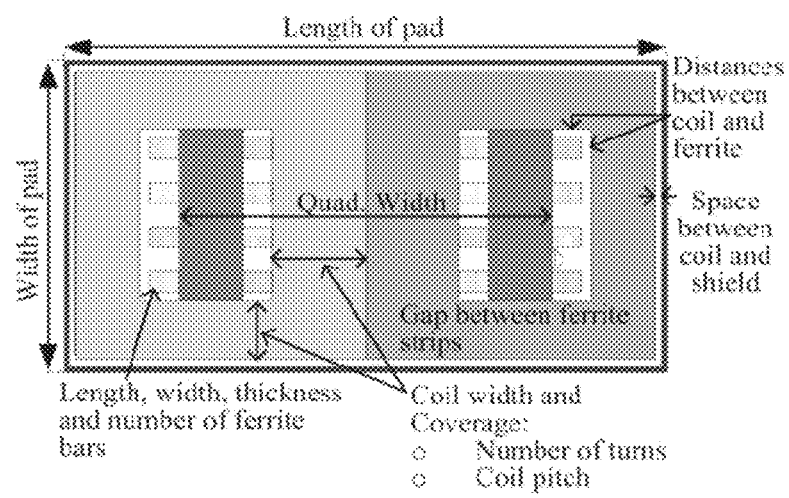

FIG. 19C is a diagrammatic plan view of an embodiment of a receiver pad including a quadrature coil.

Figure 19D:
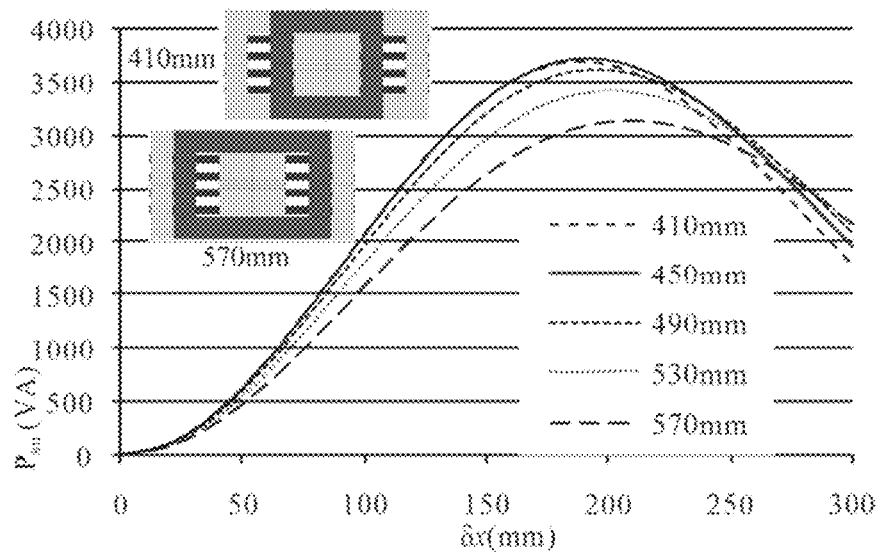

FIG. 19D is a graph showing power profiles for quadrature coils of various widths (I1=23 A) for the pad of FIG. 19C.

Figure 20A:
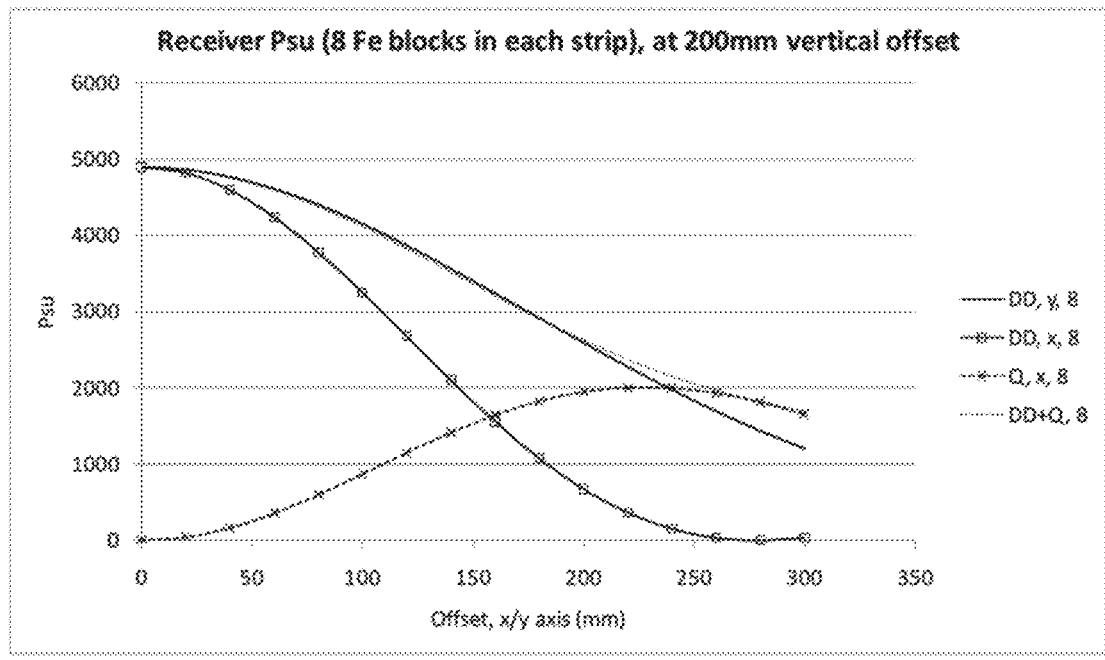
Figure 20B:
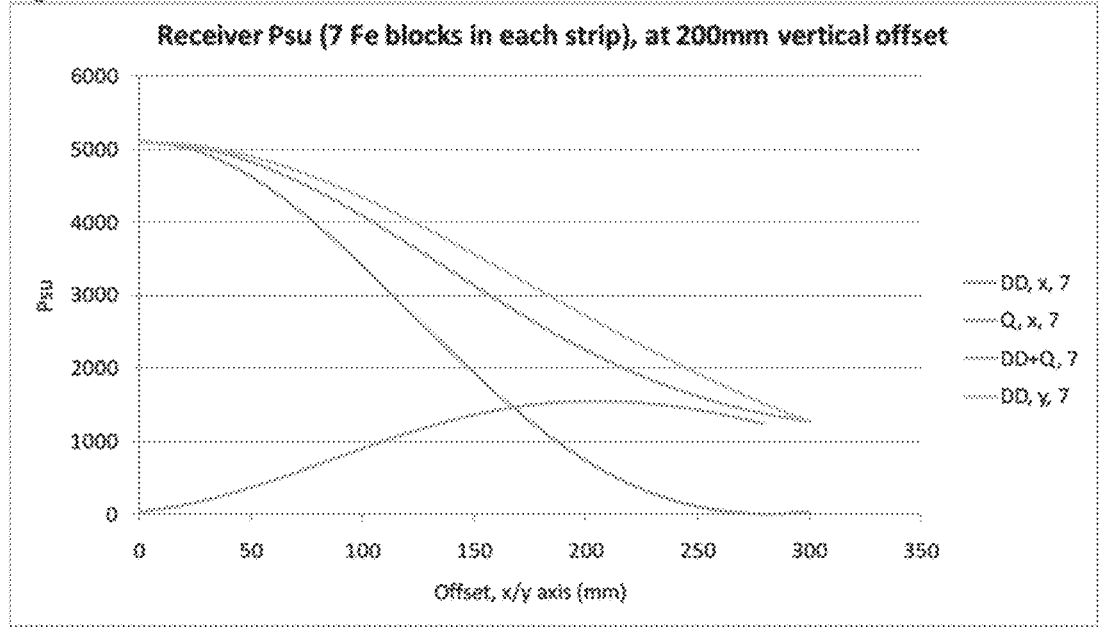

FIGS. 20A and 20B show uncompensated power for a receiver pad according to FIGS. 19A and 19B respectively at varying offsets relative to a transmitter pad.

Figure 21A:
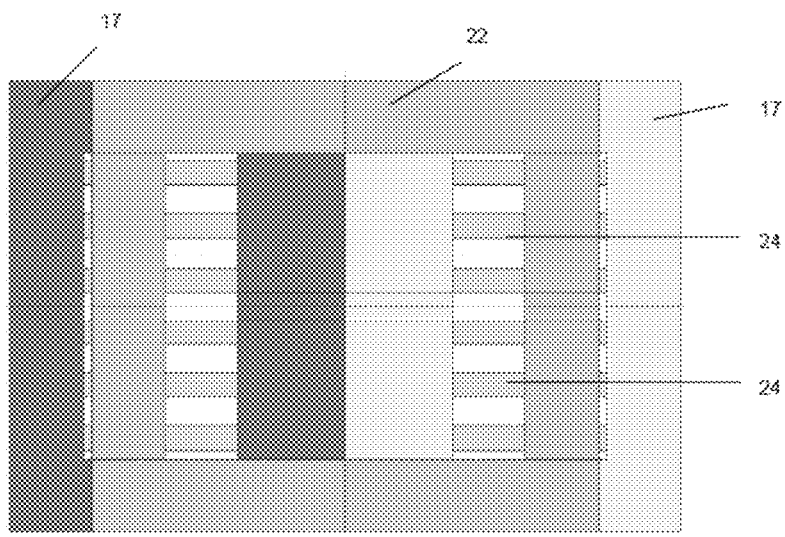
Figure 21B:
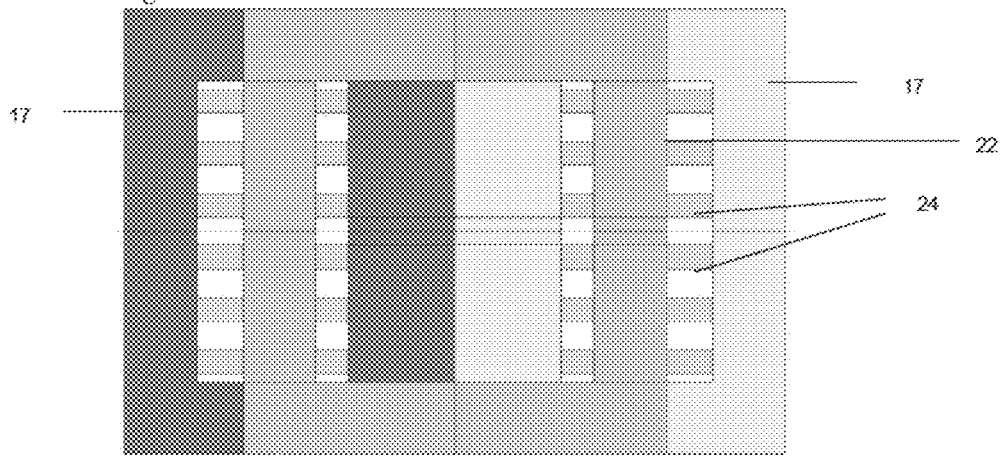

FIGS. 21A and 21B are plan views of a receiver pad from below showing different quadrature coil positions.

Figure 21C:
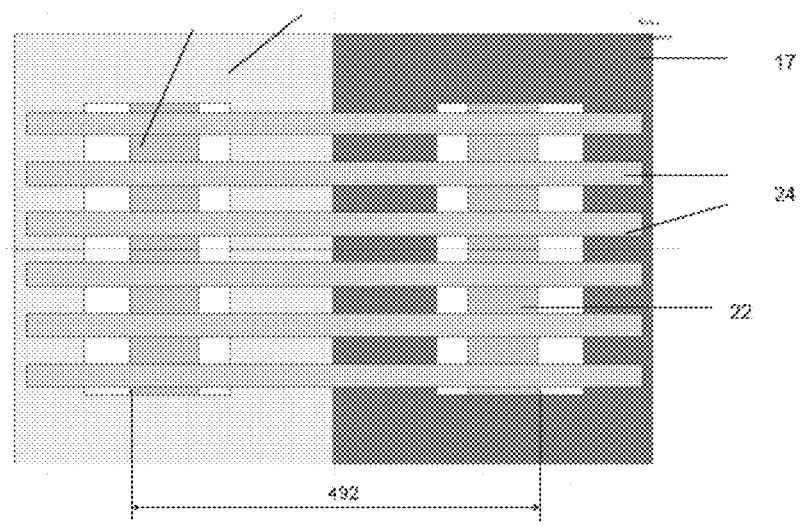

FIG. 21C is a plan view from above of a receiver having a quadrature coil in an optimum position.

Figure 22:
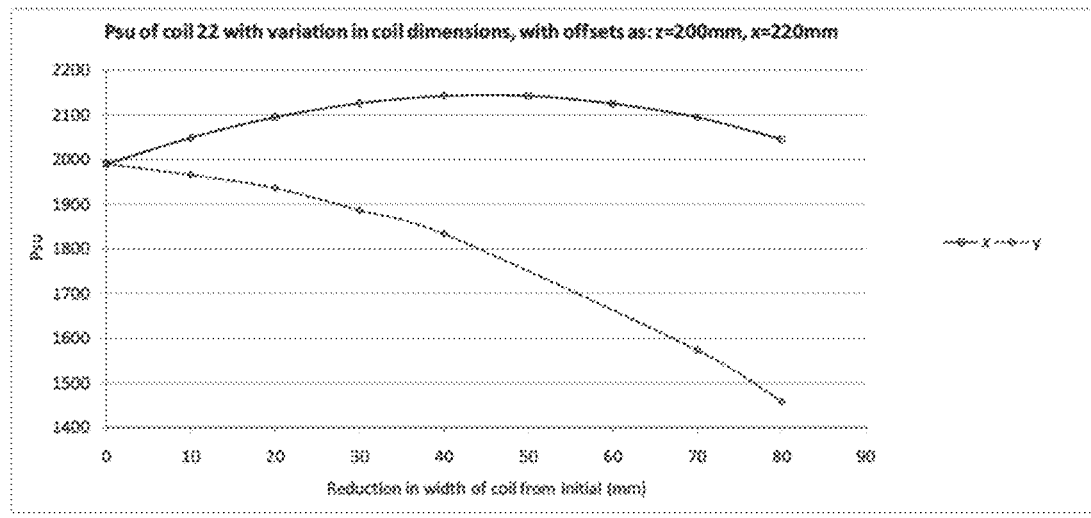

FIG. 22 shows uncompensated power for a receiver such as that shown in FIGS. 21A-21C as a function of variation in quadrature coil dimension.

Figure 23:
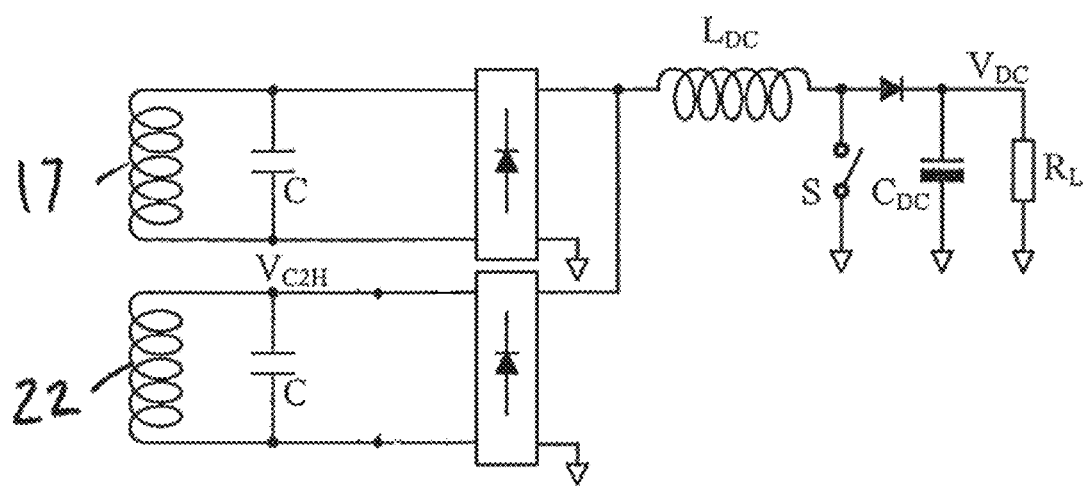

FIG. 23 shows a circuit diagram for one example of an arrangement for yuning and controlling the ouput from a receiver pad having coils 17 and 22.

Figure 24:
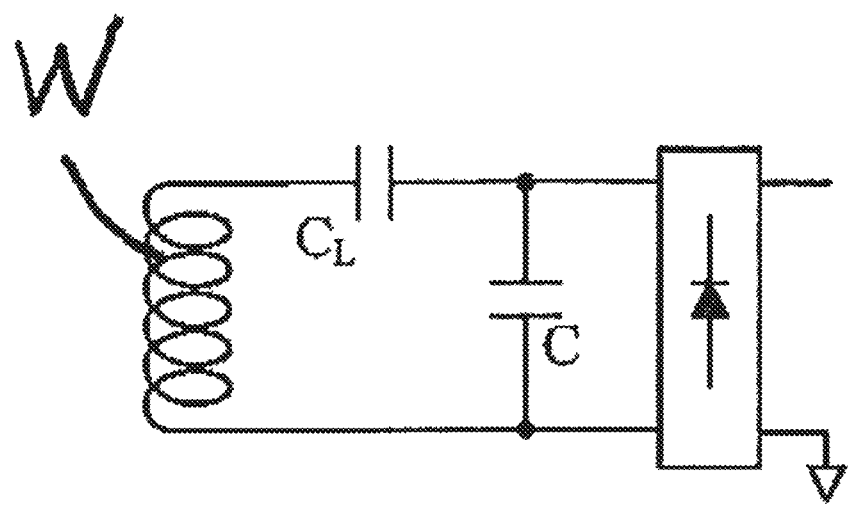

FIG. 24 shows a circuit diagram for one example of series compensation for the output of a coil in a receiver pad.

DESCRIPTION OF EMBODIMENTS

The embodiments described in this document relate to flux transmission and reception apparatus. These are commonly (although not necessarily) provided in the form of a discrete unit which may conveniently be referred to as power transfer pads i.e. arrangements that may be portable and which typically have a greater extent in two dimensions relative to a third dimension so that they may be used in applications such as electric vehicle charging where one pad is provided on a ground surface (such as a garage floor) and another in the vehicle.

However, the disclosed subject matter may also be provided in other arrangements including permanent structures such as a roadway for example, and does not need to take the form of a pad. Like reference numerals refer to like features throughout the description. It will be understood that features described in various embodiments described in this document may be combined with, or substituted for, features of other embodiments.

Figure 5A:
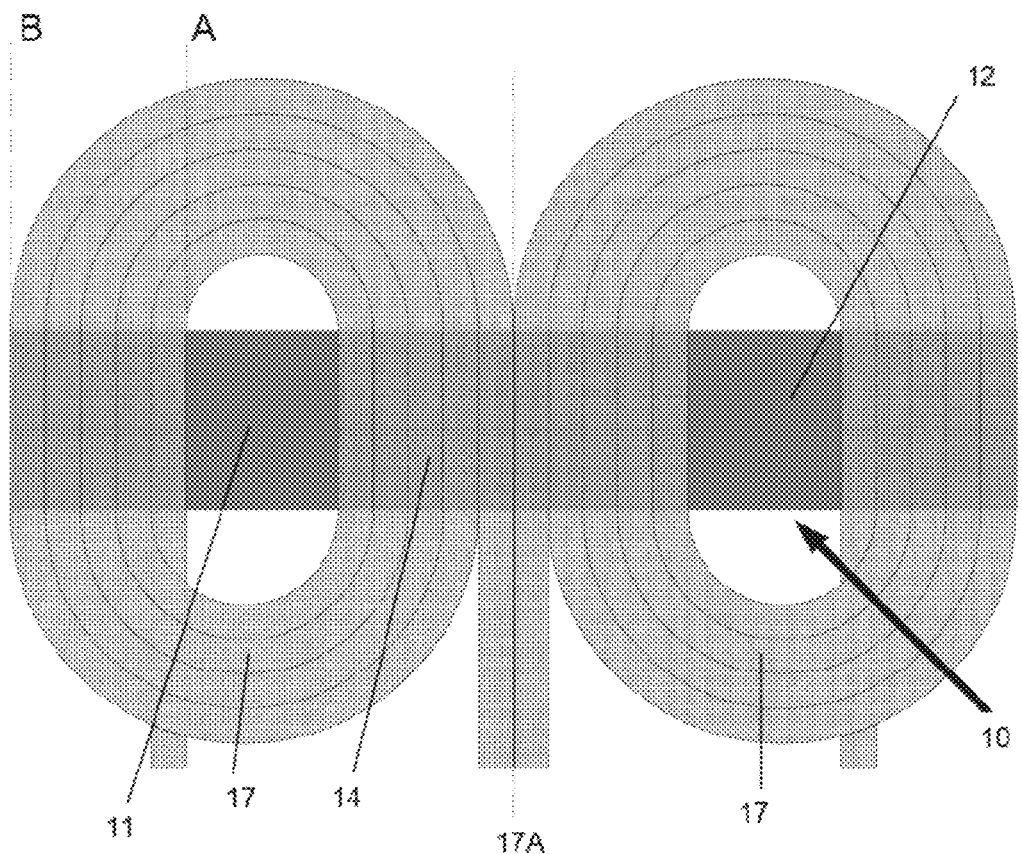
FIG. 5A is a plan view of an embodiment of inductive power transfer apparatus which may be provided in the form of a pad.

Referring to the arrangement of FIG. 5A, a pad is shown which uses a novel "flux pipe", generally referenced 10, to connect two separated flux transmitter/receiver regions comprising pole areas 11 and 12. The flux pipe provides a generally elongate region of high flux concentration from which ideally no flux escapes. The flux pipe 10 in this embodiment has a core 14 which includes a magnetically permeable material such as ferrite to attract flux to stay in the core. With electric circuits there is a large difference between the conductivity of conductors—typically $5.6 \times 10^7$ for copper; and air—in the order of $10^{-14}$—but this situation does not pertain with magnetic fields where the difference in permeability between ferrite and air is only the order of 10,000:1 or less. Thus in magnetic circuits leakage flux in air or other non-magnetic materials is always present and this has to be controlled to get the best outcome.

Flat coils or windings 17 sit in a co-planar relationship in close proximity to each other on top of the core 14 to provide the flux pipe. There is no straight path through the flux pipe that passes through the coils 17. Instead, the arrangement of the coils 17 means that flux entering the pad through one of the areas 11 or 12 propagates through the relevant coil 17 into the core 14 from where it propagates along the core, then exits the pad out through the other area 12 or 11, and completes its path through air back to the first area 11 or 12 to form a complete curved flux path. The flux path so formed is essentially completely above a front surface of the pad and extends into a space beyond the front surface. The arrangement of coils 17 also means that there is essentially no flux extending beyond a rear face of the pad. Thus, the orientation of the windings 17 ensures that the flux path is directed in a curve out into a space in front of the front surface of the pad, and the spread or distributed nature of the coils 17 across the upper surface of the core 14 ensures that the flux in the centre of the pad is primarily constrained within the core. The coils 17 also define the spaced apart pole areas so that the flux is guided into and out of the pad via the pole areas and forms an arch shaped loop in the space beyond the front surface of the pad to provide a significant horizontal flux component at a significant distance above the front surface of the pad.

In one embodiment there are two coils 17 in close proximity to each other. The coils 17 are spiral wound. In the diagrammatic embodiment illustrated in FIGS. 5A to 5C the coils 17 take the form of Archimedean spirals, and are touching along the centre line 17A. The flux pipe 10, comprising core 14, extends to the ends of the coils 17. The coils 17 are substantially planar and are arranged in substantially the same plane on one side of the core 14. The actual length of the core 14 is not critical—in one embodiment it should include the centre line of the coils 17 and should extend past the hole in the centre of each coil to at least the position indicated by A. The core 14 may extend under the coil 17 to position B or even further. The holes in the coils 17 define the pole areas 11 and 12 which function as flux receiver/transmitter regions for the pad.

Figure 5B:
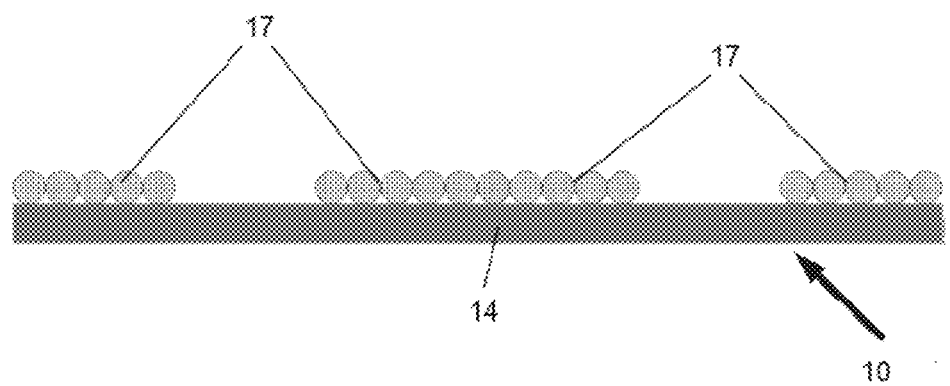
FIG. 5B is a side elevation of the apparatus of FIG. 19A.
Figure 5C:
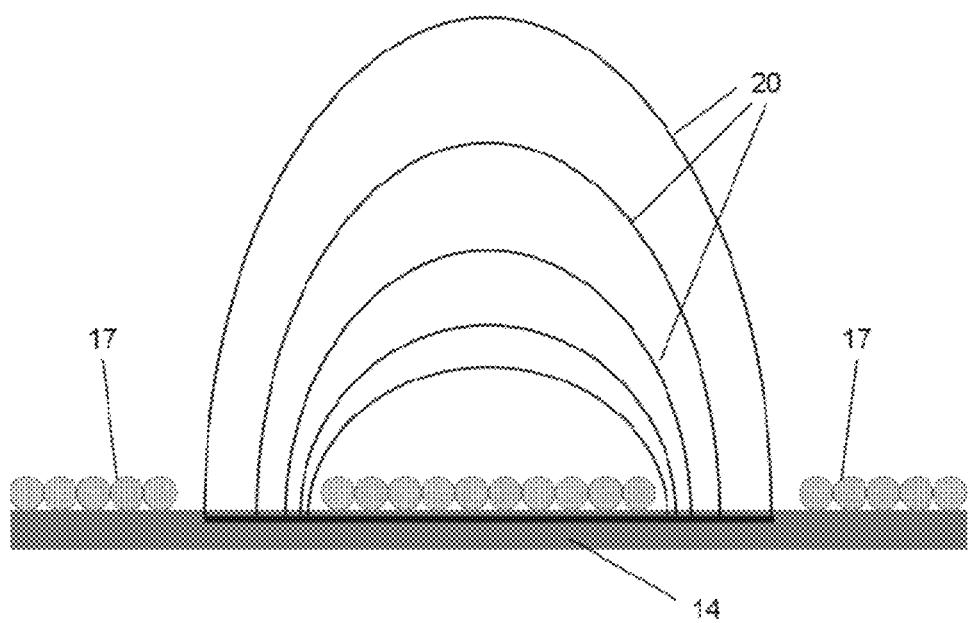
FIG. 5C is a view of FIG. 5B but also showing flux lines.
Figure 7A:
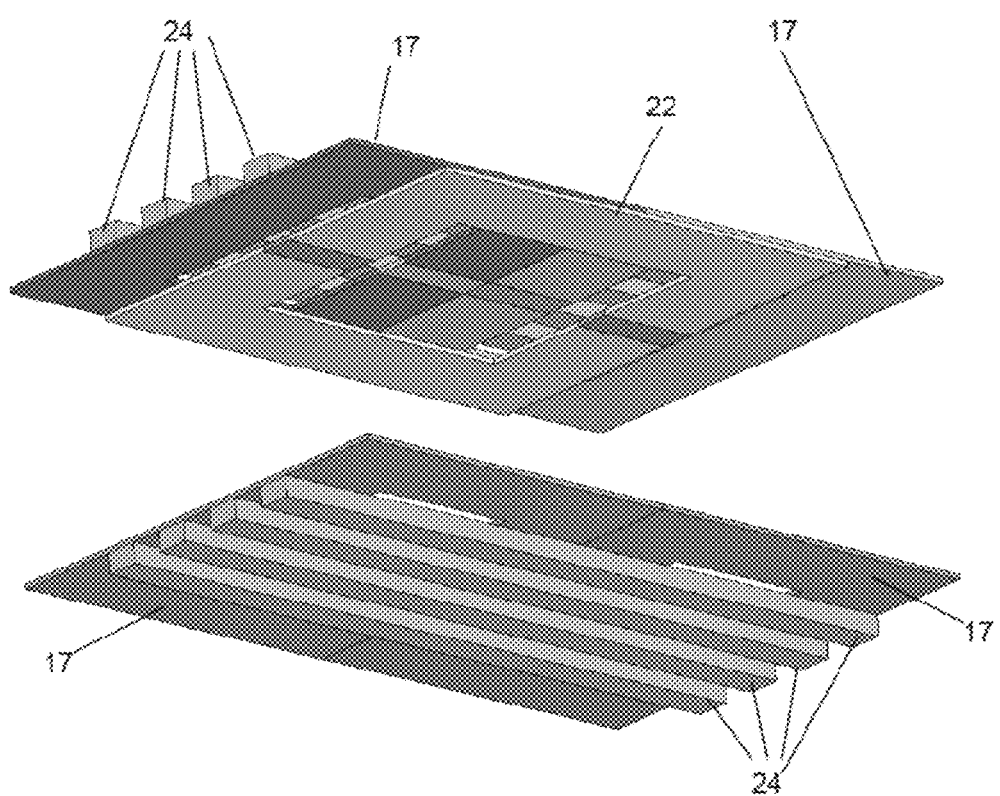
FIG. 7A is an isometric view from below of a flux transmitter and flux receiver (oriented above the flux transmitter).
Figure 7B:
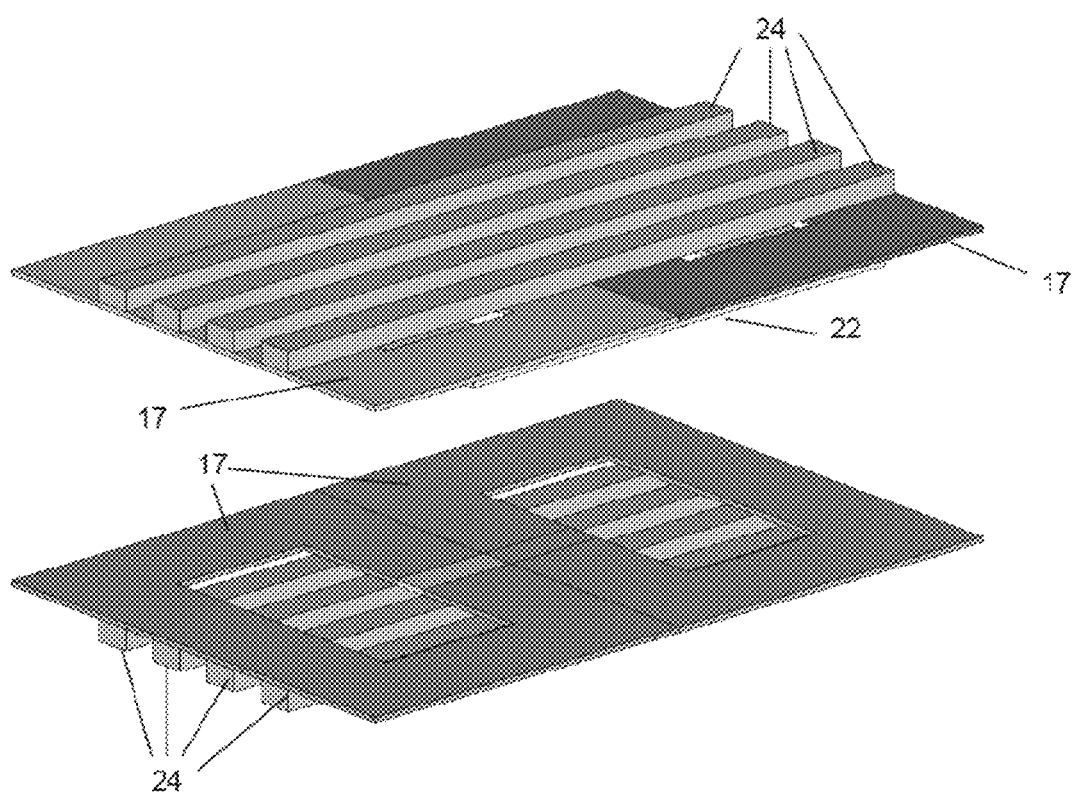
FIG. 7B is an isometric view from above of the arrangement of FIG. 7A.

In one embodiment the core 14 is made of ferrite bars in strips or lengths (not shown in FIGS. 5A-C, but illustrated in FIGS. 7A and 7B). Air-gaps are acceptable between the strips, to reduce the weight and cost of the device, and to simplify manufacture. The ideal flux paths 20 are shown in FIG. 5C and are only on one side of the core 14 which is an ideal situation. In principle there is ideally no flux extending out the rear face of the pad (i.e. on the side of the core 14 opposite to the side on which coils 17 are mounted) and therefore no aluminium screen or other flux repelling member is required. However, in practice a light screen may be used in some embodiments as errors and imperfections in the ferrite bars comprising the core 14 can cause small leakage fluxes that should be contained.

Inductive power transfer pads according to the arrangement described immediately above are very easy to use as the leakage flux from them is very small. They can be placed quite close to metallic objects without loss in performance, and they are largely unaffected by connecting wires etc.

In another embodiment it may be noted that the arrangement of the coils in a receiver or pick-up pad mounted horizontally on a vehicle, for example, makes the pick-up pad sensitive to a first direction of the flux which is longitudinally directed (i.e. having a direction parallel to the core 14, and being in the X-axis direction with reference to the drawings) with respect to the flux generator (the horizontally oriented transmitter pad). To improve the magnetic coupling of the receiver with respect to misalignment, a "second" coil can be arranged that is sensitive to a second component of the flux that is preferably vertical with respect to the stationary transmitter.

Figure 6:
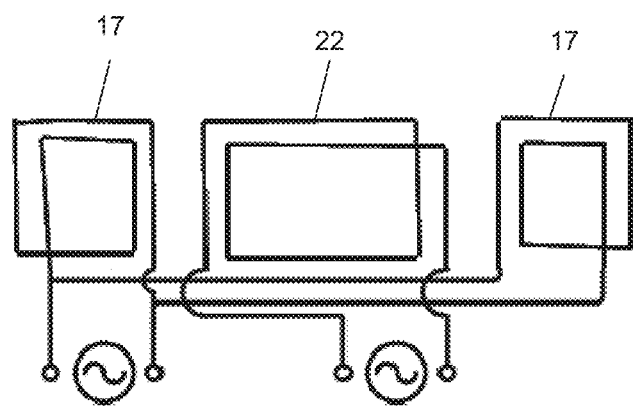
FIG. 6 is a diagrammatic illustration of an electrical wiring diagram for a further embodiment of inductive power transfer apparatus including a centre, or quadrature coil.

FIG. 6 shows an electrical schematic of a further embodiment of a receiver pad with a "horizontal" flux sensitive coil 22 now positioned in the centre and the outer two coils 17 connected out of phase to produce a further coil sensitive to the vertical component. In this figure the outer two coils are connected in parallel, however in another embodiment coils 17 are connected out of phase but in series to distribute any loading between them.

For the receiving pad of FIGS. 5A-5C a further flat coil 22 can also be placed above the flux pipe with one suitable arrangement shown in FIGS. 7A and 7B, coil 22 being sensitive to the vertical component of the field. As in the original pick-up structure, this additional coil exists only on one side of the core 14 and therefore ideally maintains all of the flux lines on the side of the receiver directed towards the transmitter.

As shown in FIGS. 7A and 7B, only the receiver is modified with a central, or quadrature, coil 22. This central coil 22 is particularly sensitive to misalignment in the X-direction (i.e. the horizontal longitudinal direction), but not in the Y-direction (being the horizontal transverse direction perpendicular to the core 14). This complements the original receiver which is sensitive to misalignment in the Y-direction, but which because of its structure is less sensitive to movement in the X-direction. The combined output of both receiver coils enhances the sensitivity of the receiver enabling the receiver to be positioned nominally in the ideal position and still couple the required power. FIGS. 7A and 7B also show an arrangement of spaced ferrite rods or bars 24 that comprise core 24.

Figure 8A:
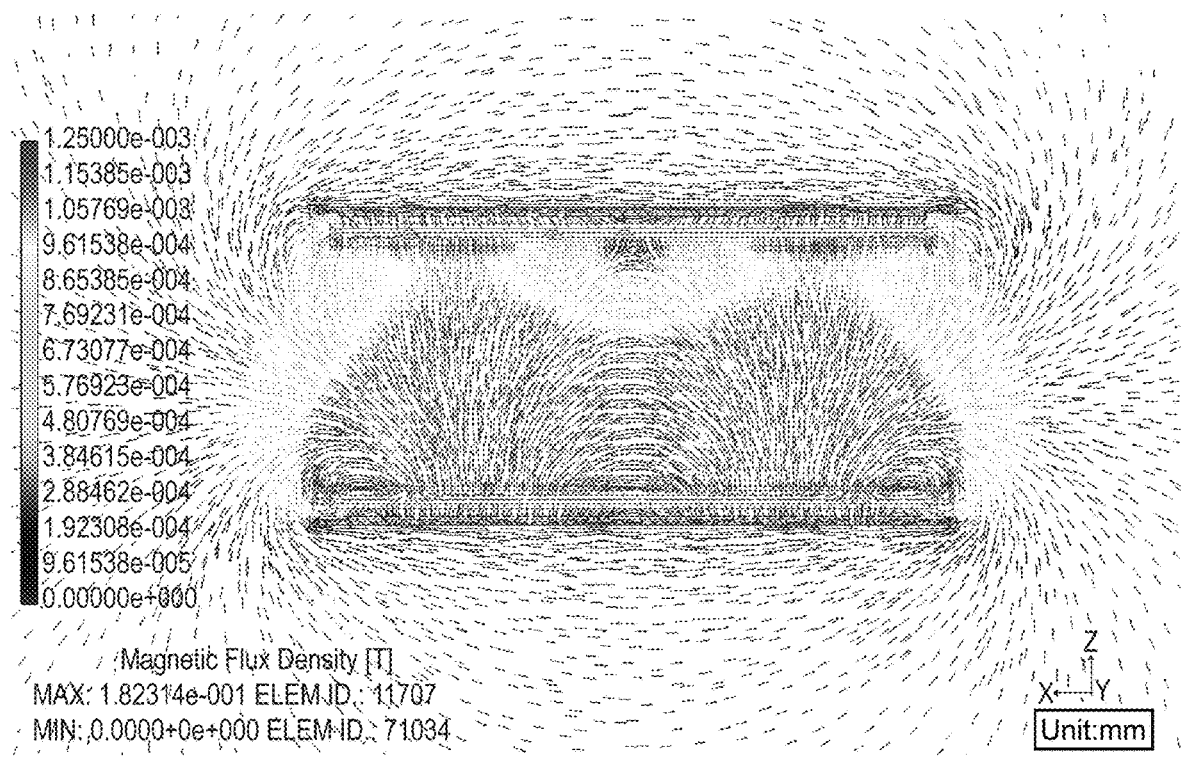
FIG. 8A shows flux lines based on a simulation of the arrangement of FIGS. 7A and 7B when the transmitter and receiver are aligned with a 200 mm separation between the transmitter and receiver.
Figure 8B:
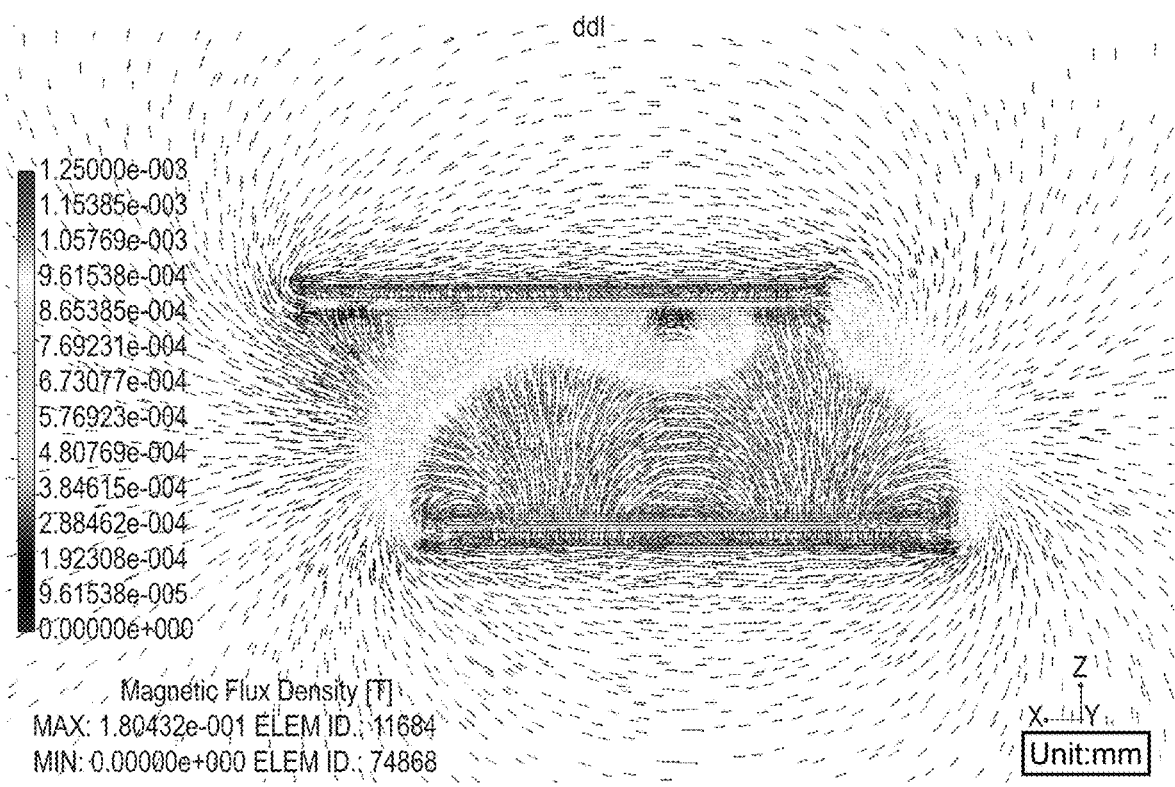
FIG. 8B shows flux lines based on a simulation of the arrangement of FIGS. 7A and 7B when the transmitter and receiver are misaligned in the X axis direction.

As an example, the flux lines using the pad design as shown in FIGS. 7A and 7B without any form of compensation are shown in FIGS. 8B and 8A with and without some misalignment. Here the transmitter pad and receiver pad are identical except for the addition of the second "vertical flux" coil (i.e. coil 22 of FIGS. 7A and 7B) in the receiver pad. The transmitter and receiver pads both have length 588 mm and width 406 mm and are separated vertically by 200 mm. The current in the coils of the transmitting pad is 23 amps at 20 kHz. Notably the majority of the flux exists between the transmitter pad and receiver pad while a very small leakage flux is shown to exist outside this area. In FIG. 8A these flux lines couple the first receiver coil, while in FIG. 8B the majority of the flux lines couple the second receiving coil (i.e. coil 22 of FIGS. 7A and 7B) thereby enhancing the output power capability of the pick-up.

Figure 9:
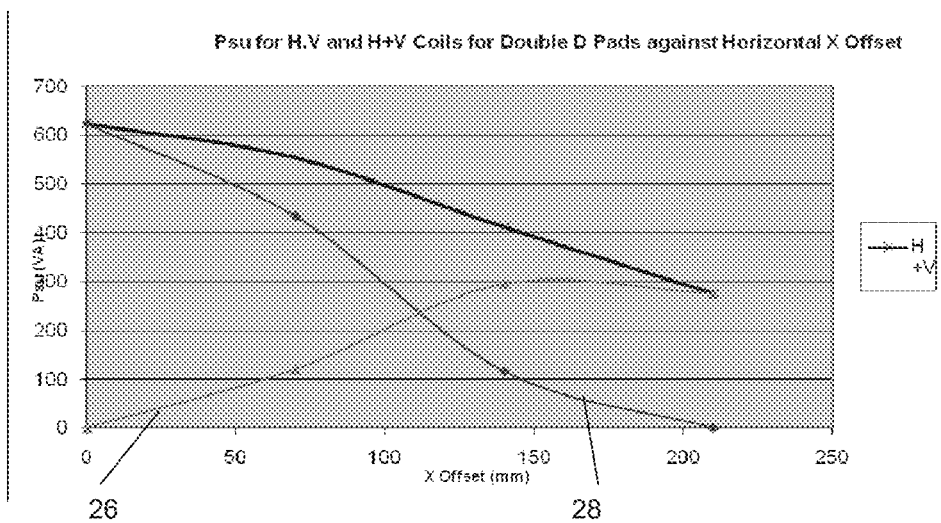
FIG. 9 is a diagram of power against displacement in the X axis direction for the arrangement of FIGS. 7A and 7B.
Figure 10:
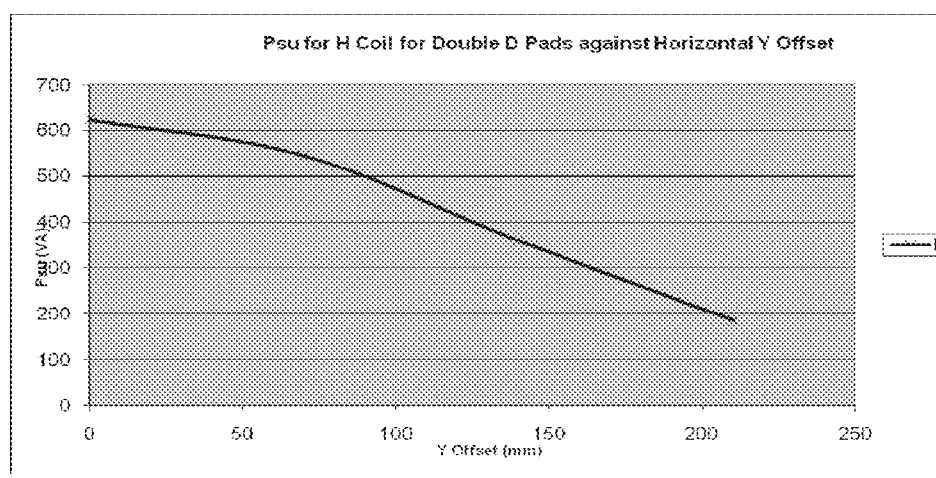
FIG. 10 is a diagram of power against displacement in the Y axis direction for the arrangement of FIGS. 7A and 7B.

In FIGS. 9 and 10 the VA generated from the output of the receiver pad coils with and without misalignment is also shown. In FIG. 9 the total and separate VA contribution of receiver coils from a magnetic simulation of the pads shown in FIGS. 7A and 7B is shown when the receiver pad is misaligned (relative to its ideal position centred above the transmitter pad) in the X direction. In FIG. 9 curve 26 represents the VA contribution of coil 22, curve 28 represents the combined VA contribution of coils 17, and the remaining curve represents the total from coils 17 and 22. As noted the second coil 22 substantially enhances the output so that if a 2 KW output were required at 0 X-offset the required electronic tuning must boost the VA output by around 3.2. At 140 mm X-offset the required electronic boost (Q) without coil 22 is more than 17 times (which is practically difficult due to the sensitivity of the tuning required) whereas with coil 22 an effective boost of around 4.8 is required and that is easily achieved.

Coil 22 is not expected to be sensitive in the Y direction when the receiver is positioned with 0 offset in the X direction. This is verified in the magnetic simulations shown in FIG. 10 where there is shown to be no contribution to the total power from the coil 22. This is however not required as the combined output of coils 17 is naturally sensitive in this direction. At 140 mm offset in the Y direction, a 2 KW output is possible with an electronic tuning (Q) of around 5.5.

From FIG. 7A and FIG. 7B it is shown that the receiver pad is different to the transmitter pad as it includes an additional coil 22. Coil 22 (as noted in FIG. 9) provides improved power transfer whenever the receiver is shifted laterally from its ideal centered position above the transmitter in the x direction. In practice it is desirable to ensure that not only is there an improvement in the total coupled VA (which comprises the VA contribution from each coil, where the coupled VA from a particular receiver coil is known to be Psu=open circuit voltage of each receiver pad coil (Voc) multiplied by its short circuit current (Isc)), but also that variations in the transmitter pad inductance which result from variations in coupling due to lateral movement of the receiver pad relative to the transmitter pad (in the x and y directions) are minimized. In practice there will be some variation, but it is preferable that this change is consistent with offsets in either the x or y direction. This can be achieved if the combined reflected impedance (independent of load) of the horizontal and vertical flux receiver coils is essentially constant with a known radial ($r=f(x^2+y^2)$) offset.

In consequence, the design of the receiver pad will be different to the transmitter, and there is a need to optimize the position and size of coil 22 along with the width (number of ferrite strips or bars 24) and the length of these ferrite strips 24 in core 14 (as shown in FIGS. 7A and 7B) to optimize the power transfer with likely misalignments in either the x or y direction, with the object of shaping the power profile as desired.

FIG. 18A and FIG. 18B show both the magnetic transmitter and receiver in relative position but with different views. The views are from below in FIG. 18A, and from above in FIG. 18B. As shown, there is a difference between the lengths of the ferrite strips in core 14 of the receiver pad which comprises coil 22, compared with the lengths of the ferrite strips that comprise core 14 in the transmitter. Here each strip of the receiver pad comprises 6 rows of 8 ferrite blocks, where each ferrite block has a length of 93 mm. The transmitter pad has 6 rows of 7 blocks of ferrite. Notably the number of strips and their length can be optimized in the receiver to better balance the Psu achieved in the receiver with lateral offsets in both the x and y directions. An example of such an optimization is shown in FIGS. 19A and 19B (where the receiver pad is viewed directly from above). In FIG. 19A the key dimensions of the original receiver pad are shown. In FIG. 19B (as shown) only the length of the ferrite strips is changed from 744 mm (constructed using 8 ferrite blocks each 93 mm long) to 651 mm in FIG. 19B (constructed using 7 identical ferrite blocks). The Psu outputs from each receiver coil when driven from the same transmitter pad as indicated in FIG. 18 at a vertical offset of 200 mm and varying offset spacing are shown in FIGS. 20A and 20B respectively. Here the uncompensated power of coils 17 which are sensitive to horizontal flux is labeled "DD", while the uncompensated power achieved from coil 22 sensitive to the vertical flux is labeled "Q". FIG. 20A shows that there is an improvement in the vertical flux capture of coil 22 when the ferrite strips are longer, but at the expense of the Psu in coils 17. It is also clear that the total Psu with x and y offset is similar in FIG. 20A whereas there are notable differences between these respective Psu's in FIG. 20B. Thus the system can be optimized to suit the characteristic Psu profile desired.

The position and size of Coil 22 in the receiver also needs to be optimized to best capture the vertical flux from the transmitter pad. As an example, FIG. 21A and FIG. 21B show a view looking directly from beneath the receiver pad to better view coil 22 and its position relative to coils 17. In FIG. 21B coil 22's dimensions are reduced in the x direction (compared with FIG. 21A), while its y dimension remains constant. This reduction has the effect of reducing its inductance and changing the number of vertical flux lines captured. Coil 22 can also be reduced in the y direction, or in both the x and y directions simultaneously. FIG. 22 shows the impact on the Psu of coil 22 when the receiver is positioned 200 mm vertically offset in the z direction (relative to the transmitter pad) and having a lateral offset of x=220 mm. As shown the coupled uncompensated power reduces for all reductions in the y direction (as expected), but has an optimum when this coil is reduced by approximately 45 mm to that shown in FIG. 21C. This maximum coupling condition arises when coil 22 has a dimension that closely matches the distance between the centres of the poles of coils 17 in the transmitter pad. If it is smaller, not all of the available vertical flux is captured, while if it is made larger, some flux lines cancel, as it captures part of the return path.

Another embodiment is shown in FIG. 19C which shows the design variables for a built receiver pad measuring 770 mm×410 mm that uses four strips (as shown in FIG. 19C) comprising 8×193 cores. The coils were made up of 20 turns of 6.36 mm2 Litz wire wound with a pitch of 6.1 mm resulting in a flux pipe length of 240 mm (43% ferrite coverage). We have found that Litz wire manufactured from aluminium (rather than the conventional copper) offers significant unexpected advantages. Aluminium has previously been considered to be unsuitable because it is very fragile and it cannot be soldered to make terminations. However, we have found that it can be manufactured as Litz wire from individual strands of 0.3 mm diameter and in such a form is lighter and provides up to approximately seven times as much useful wire as copper for a comparable cost. Aluminium Litz wire can be used in other flux generating and receiving magnetic structures which include the pad structures described in this document and others including without limitation the circular pads referred to in WO2008/140333 for example. Aluminium can also be used as copper clad alumium which can be drawn to size, and assembled if desired to provide litz wire. It can thus be soldered, and is about 75% lighter than conventional copper wire while being able to be used essentially as a conventional wire as well as litz wire.

A feature of the receiver which includes coils 17 and 22 is that all three coils 17, 17 and 22 capture vertical flux but it is the interpretation of the outputs from these coils that allows a horizontal and vertical component of the flux to be determined. FIG. 23 illustrates one example of how coils 17 (series connected), and coil 22 are parallel tuned by tuning capacitors C. As can be seen, the output of each tuned circuit is rectified and combined before being provided to a control circuit.

It has been determined that a reduced quadrature coil (i.e. coil 22) width provides better performance. An optimization process was performed which involved taking power profiles in the x direction for quadrature coils of various widths (the width of pad dimension in FIG. 19C). The profiles were done with a 125 mm air gap and the results are shown in FIG. 19D. The insets show the coil width range for quadrature coil 22 given it has to fit within the DD coils 17. The highest Psu is achieved with a 450 mm wide coil however a width of 410 mm was chosen given the Psu is similar but there is an overall reduction in the length of Litz wire of 1.6 m.

As the receiver Pad moves laterally (in the x or y directions) there will be a change in the transmitter pad inductance due to movement in ferrite causing the transmitter pad to have a maximum inductance when the receiver pad is centered above it and a minimum inductance when the receiver is not present. It is preferable if the system magnetic design can be configured to minimize these inductance changes as this aids in tuning of the transmitter and helps the power transfer for the total system. Some compensation for these magnetic changes can be achieved if receiver coils 17 and coil 22 are parallel tuned for resonance at the driving frequency ($\square$) of the transmitter. This is achieved by selecting the tuning capacitors for each coil (as shown in FIG. 23) so that when the coils 17 and 22 and their tuning capacitors are connected in parallel the arrangement is tuned for resonance at the frequency at which power is to be transferred inductively to the receiver pad. Parallel tuning coils 17 and 22 in this manner reflect a capacitive impedance back to the transmitter to at least partially compensate (and normally overcompensates) for the increased inductance of the receiver. Therefore, each secondary coil will reflect VARS onto the transmitter pad that will reduce the transmitter pad effective inductance. The total reflected impedance (independent of load) from the transmitter when the receiver pad coils are parallel tuned and operating at or near their tuned frequency is position dependent and given by:

$$Z_R = -j\omega\left(\frac{M_H^2}{L_{2H}} + \frac{M_V^2}{L_{2V}}\right) = -j\omega\left(\left(\frac{N_1}{N_{2H}}\right)^2 \kappa_H^2 L_{2H} + \left(\frac{N_1}{N_{2V}}\right)^2 \kappa_V^2 L_{2V}\right)$$

Here, MH is the Mutual coupling between the transmitter pad and the combined horizontal flux receiver coils of 17, MV is the Mutual coupling between the transmitter pad and the vertical flux receiver coil 22. L2H is the combined inductance of receiver coils 17 and L2V is the inductance of receiver coil 22.

$$\kappa_H = \frac{N_{2H}}{N_1}\frac{M_H}{L_{2H}} \text{ and } \kappa_V = \frac{N_{2V}}{N_1}\frac{M_V}{L_{2V}}$$

are position dependent coupling coefficients that are independent of the number of turns in either the transmitter or receiver. N1 is the number of turns in the transmitter pad, N2V is the number of turns in vertical flux receiver coil 22 and N2H is the number of turns in the horizontal flux receiver coils 17.

As stated, ideally ZR will help compensate for the increased inductance of the transmitter pad due to the presence of ferrite in the receiver pad, however it is also desirable to ensure that the maximum required power can be delivered to the load at any given vertical offset (z) within a desired radial offset "r". The above equation for ZR shows that ideally it is independent of any change to the secondary turns. In practice, if an increase in turns causes the receiver coil to spread over a wider area there will be some change in flux capture due to changes in the coil layout which will affect $\square$ slightly, and this can be exploited in the design and optimization process.

Changing the number of turns in one of the receiver coils does however change its inductance, Voc and Isc. It is well known that the maximum output power of a tuned coil operating at resonance is given by P=Isc*Voc*Q, where Q is the load dependent tuned resonance factor. In parallel tuned systems the output voltage is directly related to Voc*Q, while the maximum load current is fixed by Isc. As such Isc is a critical parameter whose value limits the maximum power transfer (similarly Voc is the critical parameter for series tuned systems that limits maximum power transfer). In a battery charging system the output voltage is fixed by the battery which in a parallel tuned system fixes the Voc*Q product and limits Q. In consequence it is essential that if power needs to be transferred at a defined lateral (radial) offset "r", then the available Isc should be ensured by adjusting the receiver turns in one or either receiver coils. This will also ensure that Voc is maximized at the extreme operating point thereby minimizing the operating Q required to deliver maximum power. A lower Q means greater efficiency and stability given the total current in the receiver coil $I_2=I_{SC}\sqrt{Q^2+1}$, and the bandwidth of the tuned receiver is inversely proportional to Q.

Referring again to the Psu of both receiver coils in FIGS. 20A and 20B, it is desirable to have the available Psu in both the x and y directions closely matched to keep both the required operating Q and any variations to a minimum. The Psu in the y direction is governed by the width of both the transmitter and receiver, the width of coils 17 and the number of ferrite strips in core 14. The achieved Psu with lateral offset in the x direction is governed by the length of the transmitter and receiver (the length of the ferrite strips and both coils 17 and coil 22). As shown for the presented design in FIG. 20A, the Psu is essentially matched in both lateral directions for offsets in either the x or y direction up to 200 mm offset. The results of FIG. 20A, are achieved at 20 kHz operation, where transmitter coils 17 are series connected and each wound with 21 turns so that N1=21 turns Receiver coils 17 are series connected and wound with N2H =21 turns, and coil 22 is also wound with N2V=21 turns.

At 240 mm y offset, only receiver coils 17 have any coupling, resulting in a Psu=1973 VA, derived from a Voc=470.0V, Isc=4.198 A. Here coils 17 have a L2H=891 uH and a $\kappa_H$=0.183, thus:

$$Z_R \approx -j\omega\left(\left(\frac{N_1}{N_{2H}}\right)^2 \kappa_H^2 L_{2H}\right) \approx -j3.75 \ \Omega$$

At 240 mm×offset the coupling is almost all in coil 22 resulting in a Psu from coil 22=1997 VA, a Voc=339.3 V, Isc=5.861 A, where coil 22 has a L2V=459 uH and a Kv that is approximately 0.128. Thus:

$$Z_R \approx -j\omega\left(\left(\frac{N_1}{N_{2V}}\right)^2 \kappa_V^2 L_{2V}\right) \approx -j3.75 \ \Omega$$

If the turns of coil 22 are adjusted from 21 to 29 this results in an output from coil 22 at 240 mm offset in the x direction of Voc=468.6 V, Isc=4.244 A, an inductance of L2V=875uH, and KV is approximately 0.128 $\kappa_v$=0.255, thus:

$$Z_R \approx -j\omega\left(\left(\frac{N_1}{N_{2V}}\right)^2 \kappa_V^2 L_{2V}\right) \approx -j3.75 \ \Omega$$

As expected, the change in N2V of receiver coil 22 does not change ZR but ensures that the Isc and Voc at 240 mm×offset are almost identical to the output from receiver coils 17 at a y offset of 240 mm. i.e. the total Psu from the coils of the receiver is substantially the same around a known radius of misalignment between the transmitter and receiver pads.

There are occasions when it is desirable to change ZR without adjusting the receiver pad dimensions or magnetic structure due to restrictions on size, weight or similar, or where adjustments to the magnetic structure cannot achieve the desired balance. In such cases it is possible to change the effective inductance of either of the receiver coils by adding partial series tuning to the output of the receiver in addition to parallel tuning. An example of use of partial series tuning is shown in FIG. 24 which shows the series capacitor CL in series with the coil W (which could be coils 17, or coil 22). The addition of a series capacitor reduces the effective L2 of that receiver winding without changing the number of turns or the mutual coupling M. Consequently both Isc (measured at the output of the receiver coil and series capacitor) and $Z_R$=−jωM²/L₂ increase. Thus series tuning has effectively increased the coupling coefficient □ without changing the turns ratio. Determining the best choice to achieve the desired characteristics with offset using electronic or magnetic variations is a process of optimization and design.

Figure 11:
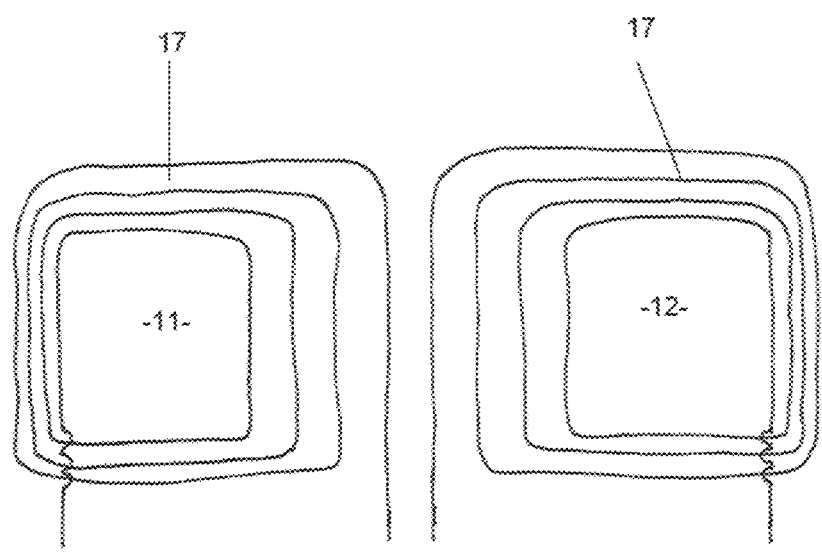
FIG. 11 is an illustrative diagram of a winding arrangement for coils of a pad of the preceding figures.

Turning now to FIG. 11, a winding arrangement for coils 17 is shown diagrammatically. In this embodiment the individual turns in the coils 17 are spread at that end of each winding nearer the centre of the pad relative to the ends of the pad. Thus the coils 17 are each asymmetric, the combination of windings of a coil being wider between the pole areas than at a periphery of the pad. This embodiment allows greater separation of the pole areas 11 and 12 (and thus greater flux extension beyond the front face of the pad). The spacing between the pole areas 11 and 12 may be made larger by using an oval or rectangular cross section litz wire wound on the narrow edge for the pole areas and wound on the flat edge for the central flux pipe region between the pole areas.

Alternatively if the coils are wound with a round wire the spacing between the pole areas 11 and 12 may be made larger using gaps between the windings of the flux pipe section between the pole areas. However, we have found that gaps in the individual windings over the flux pipe section are to be treated with care as they can leave holes that flux can leak through spoiling the efficiency of the flux pipe. We have found that it is preferable to keep the windings evenly spaced and if there are gaps they should be typically less than one half to one wire diameter to keep flux losses to a minimum. In practice we have found that the convenience of the simple round wire makes this the technology of choice. The coils 17 in this embodiment and in other embodiments may desirably be wound in series so that a single length of wire such as litz wire (or wires in parallel) is used to provide the overall coil construction.

The flux patterns produced by some winding configurations will now be discussed with reference to FIGS. 11A to 11F which illustrate the flux patterns. In all of these examples discussed with respect to FIGS. 11A to 11F a two dimensional (2D) representation of the flux pattern has been used for simplicity and clarity. The 2D representation comprises a cross-section in a plane which intersects the centre of each pole area and is perpendicular to the plane of the coils 17. The pads have overall dimensions of approximately 780 mm to 800 mm in the major dimension as shown in FIGS. 11A to 11F and approximately half that dimension in width.

The winding patterns have a significant effect on the overall flux pattern that the pad produces. In one embodiment, using the winding pattern of FIG. 11, the coils 17 consist of twenty turns each. Therefore, there are forty wires in the central flux pipe which are all placed with centres 6.6 mm apart. The end windings in the coils (i.e. those parts of the coil windings that are outside the flux pipe region between the coil centres that correspond to the centres of pole areas 11 and 12 and adjacent to the ends of the core 14) are thus twenty wires spaced with centres 4 mm apart. To assist with interpretation of FIGS. 11A to 11F, the winding portions of coils 17 that are in the flux pipe region between the pole areas are referenced 50 and the end winding portions exterior of the flux pipe region are referenced 51. The winding portions 50 in FIGS. 11A-11F all have turns at a spacing of 6.6 mm.

As the litz wire used in the construction of the coils in this embodiment is approximately 4 mm in diameter, turns spaced with centres 4 mm apart means that the wire between adjacent turns is essentially touching. This produces the flux pattern shown in FIG. 11A. As can be seen from FIG. 11A the flux pattern is very high in between the pole areas but has spillage of flux out the ends of the coils. The core 14 in this embodiment does not extend under the end windings 51 of the coils, so there is no ferrite under the end windings which amplifies the height and spillage of the flux.

Figure 11A:
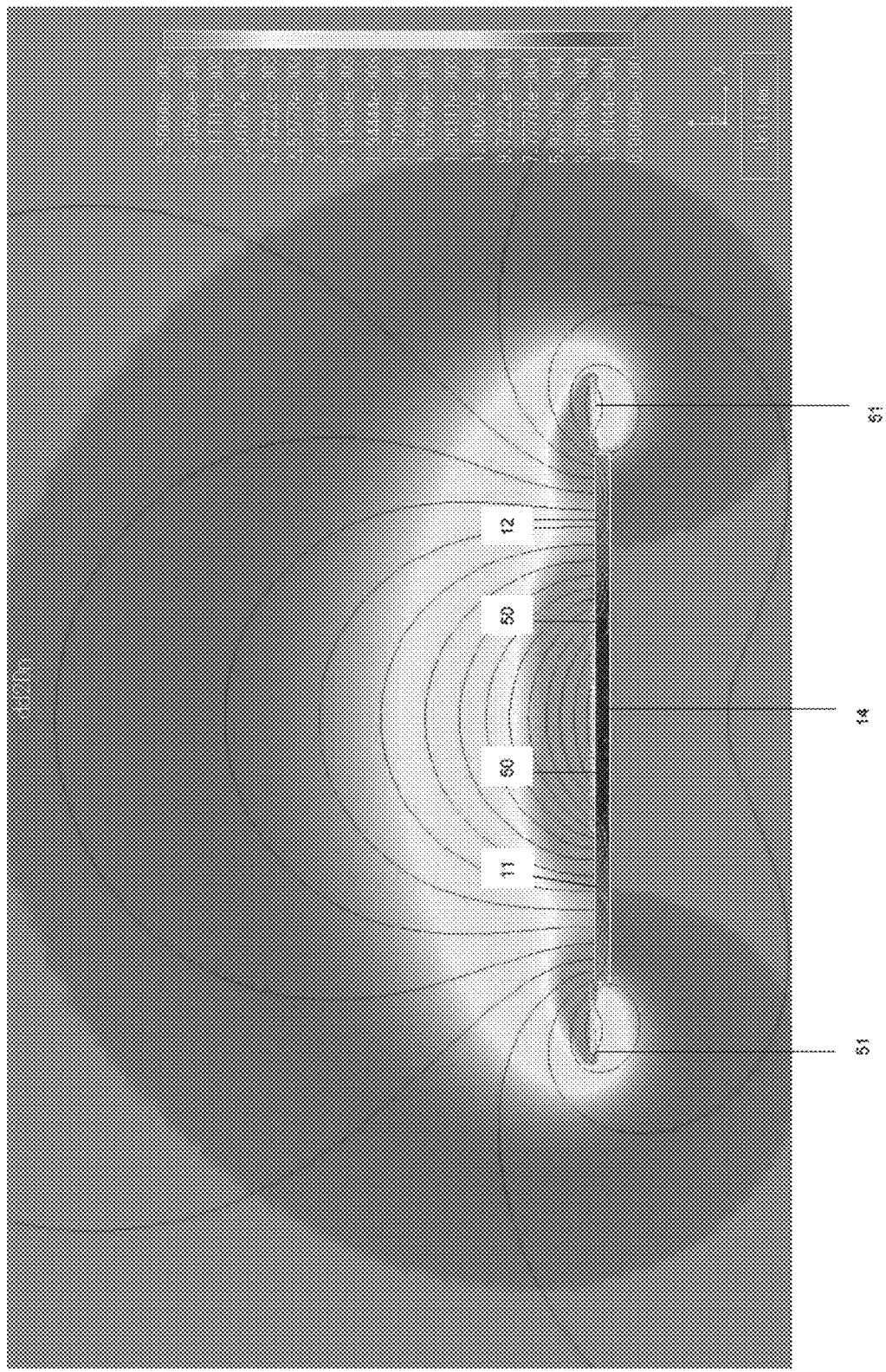
Figure 11B:
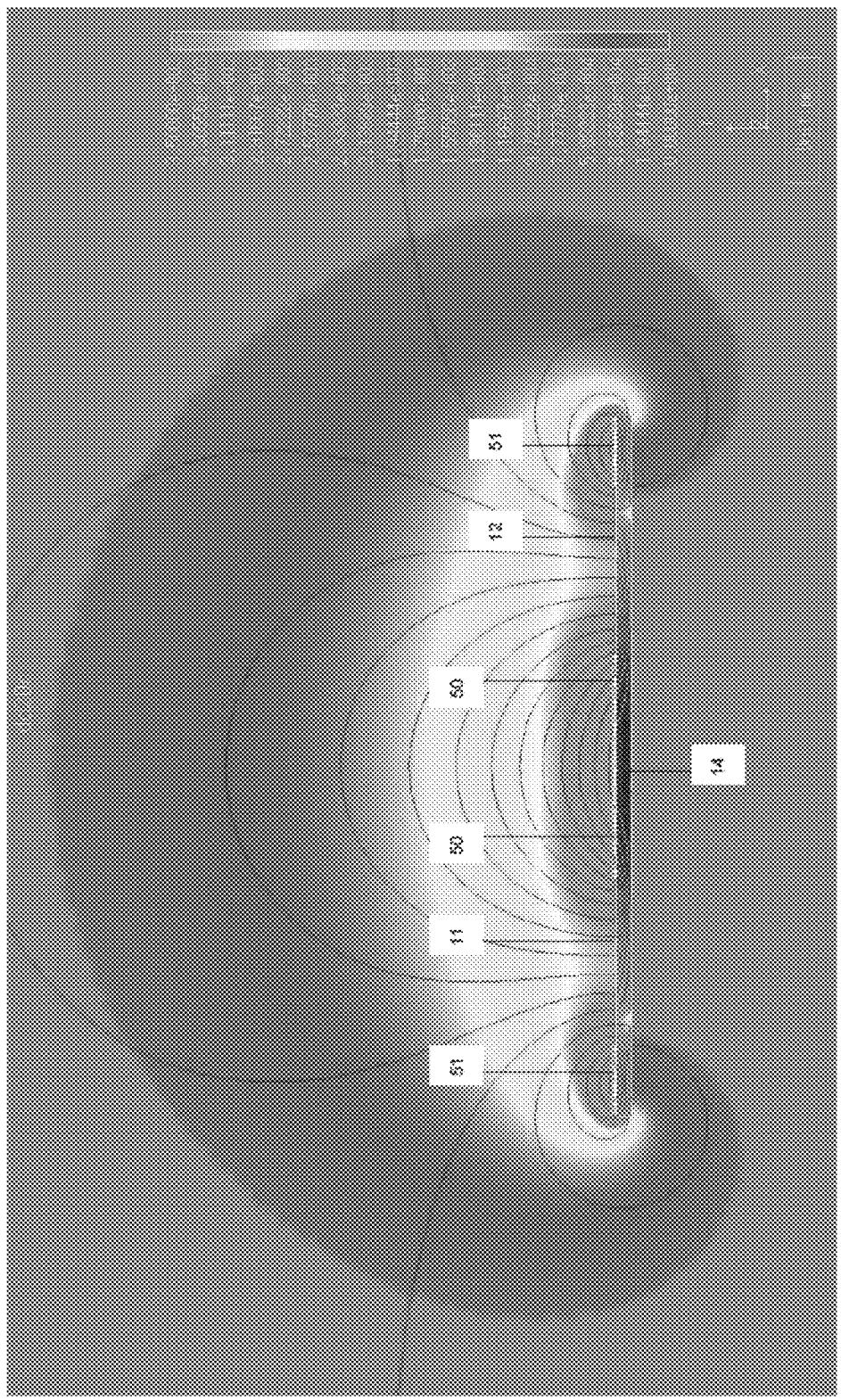
Figure 11:
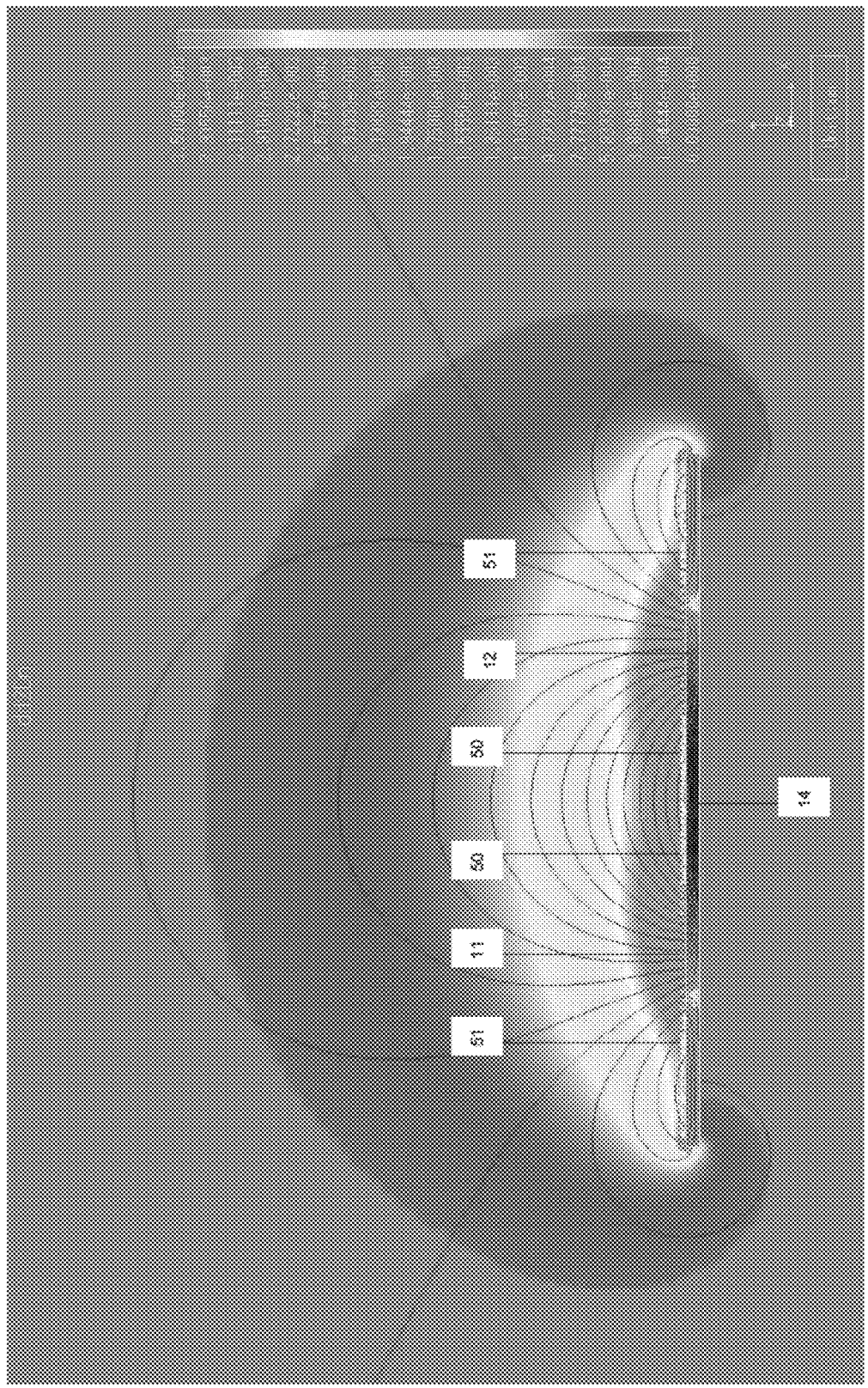

FIG. 11B shows the flux pattern produced by another embodiment. The winding construction for this embodiment is the same as that shown in FIG. 11A. However, the core 14 extends beyond the pole areas under the end windings 51. This flux pattern is somewhat lower than that of FIG. 11A but there is substantially less spillage flux from the end windings. In practice this spillage flux from the end windings is very difficult to reduce so not having it in the first place is an advantage provided by the arrangement used to provide the flux pattern of FIG. 11B but it does use more ferrite since the core structure 14 extends substantially to the outer edge of each coil 17. The pads used to produce the flux patterns shown in FIGS. 11A and 11B are essentially the same size (FIG. 11B is 20 mm longer in an overall length of 800 mm) so direct comparisons may be made.

Further comparisons may also be made. FIG. 11C shows the flux pattern produced by an embodiment as described with reference to FIG. 11B with end windings at 9.1 mm spacing. This flux pattern is a lot lower in the region between the pole areas but has substantially less flux spillage out the end windings at the ends of the pad.

Figure 11D:
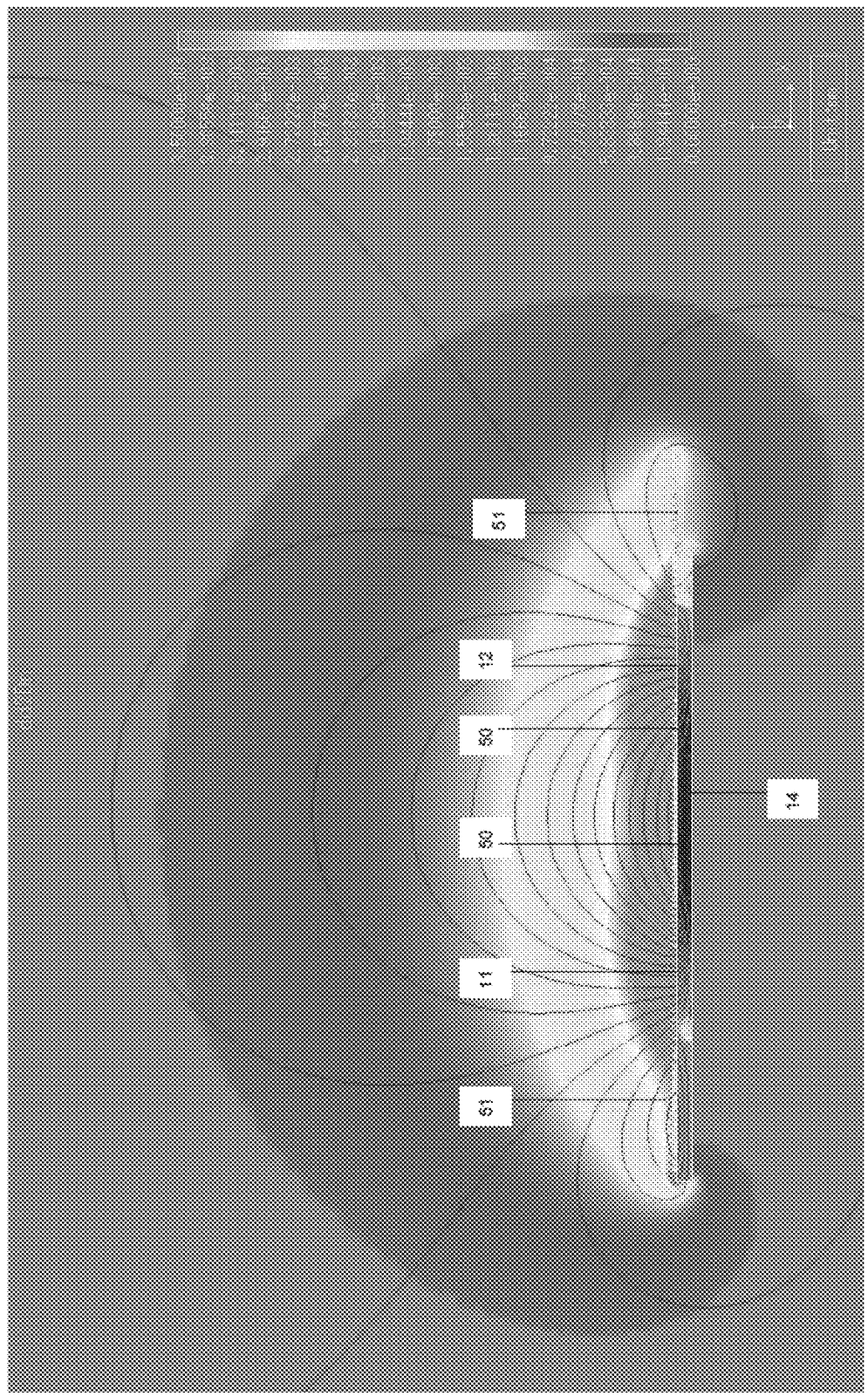

FIG. 11D shows the flux pattern produced by an embodiment as described with reference to FIG. 11C but ferrite removed from beneath the end winding 51 one end of the core structure 14 (the right hand end). This illustrates the deleterious effect on the spillage flux of not having ferrite at or near the end windings 51.

FIG. 11E shows the flux pattern produced by an embodiment as described with reference to FIG. 11B but with the turns of the end windings 11.8 mm apart between centres, and ferrite under all the end windings 51.

Figure 11F:
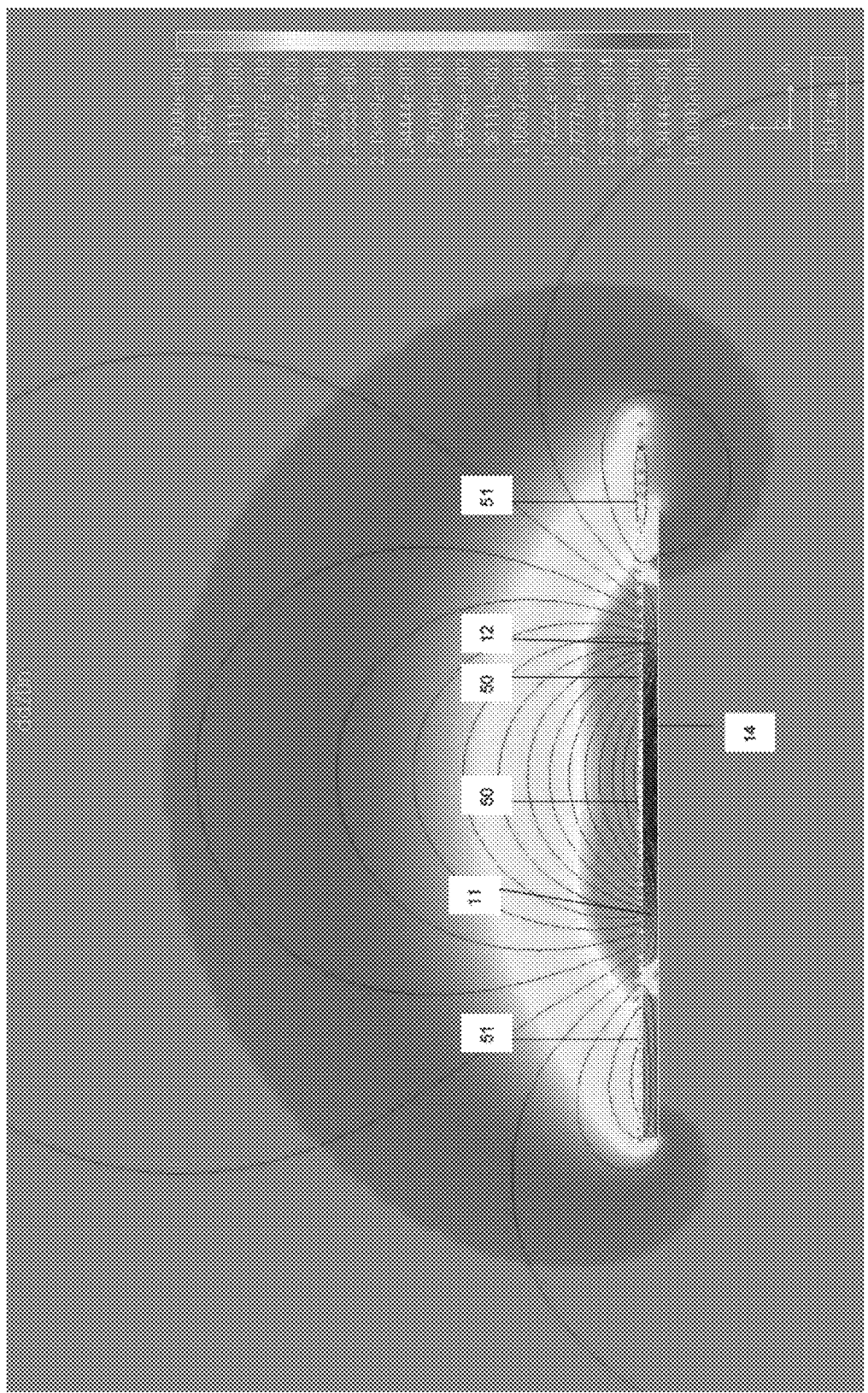

FIG. 11F shows the flux pattern produced by an embodiment as described with reference to FIG. 11E but with ferrite removed from one end of the core structure (the right hand end) so that there is no ferrite beneath the end winding 51 at the right hand end of the pad. It can be seen that the removal of ferrite adjacent to an end winding makes the flux pattern higher but greatly increases the spillage flux out the ends. It can be seen that in the FIGS. 11E and 11F embodiments the winding spacing is such that the pole areas have become indistinct, being similar in size to the spacing between turns of the end windings 51. The distinction between the central winding portions 50 and the end winding portions 51 is more easily determined with reference to the centres of the coils 17.

In like manner the spacing of the wires in the flux pipe region can also be changed to change the flux patterns but this situation is more complex as variations here must still make the winding span between the pole areas. Nonetheless there is considerable freedom afforded if the spacings are non-linear both in the flux pipe and in the end windings, to achieve exactly the flux patterns that are best for the application at hand.

Therefore an IPT system magnetic flux pad for generating or receiving a magnetic flux can be constructed which allows a required flux to be achieved at a selected distance from a face or side of the pad and/or at one or both ends of the pad. This can be achieved by varying one or more of:
- a dimension of the magnetically permeable core. For example reducing the longitudinal length of the core so that its ends do not extend partially or completely under the end windings of one or both coils. Yet another example is by varying the magnetic association between parts of the coils and the core, such as by locating turns of the coil closer to, or further away from the core or parts of the core.
- the distance between one or more adjacent turns of one or more of the coils in the flux pipe region between the pole areas relative to the distance between one or more adjacent turns of one or more of the coils outside the region between the pole areas. This may include non-linear spacings.in yet another embodiment, the shape of the windings 17 may assist in obtaining greater pole area separation. For example, the coils 17 may be wound in an approximately triangular shape with the apex of each triangle facing the centre of the pad.

Referring now to FIG. 12, a former or support plate 30 for providing a pad including the winding layout of FIG. 11 is shown in plan view. The former 30 may be constructed from any non permeable material, such as a plastic for example. The former 30 includes a first general region 32 for forming and supporting one of coils 17 (not shown) and a second region 38 for forming and supporting the other of the coils 17. Depressions 34 are provided for locating and supporting ferrite bars or other permeable members. Grooves 36 receive the individual wires that comprise the turns of coils 17 and ensure that the turns are correctly spaced. For clarity, an isometric representation of the former 30 is shown in FIG. 13.

FIG. 14 shows a backing plate 40 adapted for location on a rear surface of the former 30 i.e. for location on a side of the former that is opposite the side on which the coils 17 are located, and adjacent to a rear surface of the pad. Backing plate 40 may be constructed from a flux repelling material, for example aluminium. It is not necessary for prevention of flux exiting the rear face of a pad in use, since the design of the flat coils 17 and their location on the core 14 substantially directs the flux into a space in front of the front surface of the pad. However, plate 40 can provide additional structural support for the pad. Plate 40 can also act to prevent any changes in the magnetic properties of the pad (for example a change in inductance) should the pad be mounted in use adjacent to a magnetically permeable material for example.

The dimensions of the former 30 are approximately 790 mm by 600 mm by 25 mm, and a pad constructed from such a former will have very similar dimensions.

Referring now to FIG. 15, an embodiment of the invention similar to that shown with respect to FIGS. 7a and 7b is shown, but without the quadrature winding 22. As will be understood from the foregoing description, the coils 17 are illustrated for convenience in a substantially rectangular form, but may take other shapes. Pad A of FIG. 15 is a flux generating pad, for example a pad which may be connected to a primary power supply of an IPT system.

Therefore, the pad A may be provided on a ground surface as the stationary pad for use in the stationary charging environment such as charging a vehicle in a domestic garage or in a car park. Alternatively, pad A may be provided in a roadway surface for purposes of charging moving vehicles. Flux generating pad A is intended to provide a magnetic flux which is suitable to provide a required coupling factor with a flux receiver such as Pad B at a distance D from the coils 17 of pad A. Although the receiving pad B is illustrated as comprising a structure which is substantially the same as pad A, this is not necessarily required in practice. Therefore, for example pad B may have a similar structure and dimensions to pad A, but it may alternatively be a pad which has the same structure and different dimensions, or a different structure entirely from that of pad A.

In essence therefore if the structure of pad A is to provide a magnetic flux to a receiver pad placed distance D in front of pad A, then the overall width of the coils (of pad A) should be approximately 2D. This is illustrated in FIG. 15. As mentioned above receiver pad B may assume a variety of different embodiments other than the embodiment shown in FIG. 15.

Turning now to FIG. 16, a simplified plan view of the generator pad A construction of FIG. 15 is shown for purposes of clarity, the core, which may comprise individual ferrite bars 24 is not shown. As described above in this document, a flux pipe is provided in the core, constrained by the coils 17, in that portion of each coil between the poles 11 and 12. We have found that the length L of the flux pipe, as indicated in FIG. 16, should be at least 35% of the length W of the core 14. Furthermore, we have found that the length LP of the flux pipe should be less than 60% of the length of LC of the core 14. Therefore a preferred range of L is 35 to 60% of the length LC. A preferred range is for LP to be 40% to 60% of LC.

As illustrated in FIG. 15, the ferrite bars 24 lie in individual parallel lengths across each pad, from one coil to the other and have gaps between them. In FIG. 17, two of the bars 24 are illustrated without the accompanying coils 17 for purposes of clarity. As can be seen, the bars 24 have a substantially constant or uniform thickness T. We have found that the arrangement of the ferrite bars 24 is, in essence, optimised when the gap G between adjacent bars 24 is substantially two times the thickness T of the bars. These parameters are shown in FIG. 17. In a preferred embodiment the ferrite bars 24 are 93 mm×28 mm by 17 mm, and lie in their 28 mm dimension against coils 17. Therefore, in this embodiment, the preferred gap between adjacent bars (i.e. along the 28 mm dimension) is two times 17 mm which equals 34 mm. In this way the ferrite bars 24 are placed along lines at a spacing of 62 mm to create the core structure. To the extent that the ferrite bars are constructed from individual lengths that are less than the complete length LC of the core, the individual ferrite pieces which make up each bar are placed as close as possible to each other, ideally touching each other.

Turning again to FIG. 16, it can be seen that in the embodiment shown the outer windings of the coils 17 overlap the core structure (which may comprise individual ferrite bars). In practice, we have found that the outer windings may or may not overlap the core. However, if less ferrite is used (i.e. if the core is minimised in size), then the structure as a whole is lower cost and is lighter and as noted above produces a higher flux pattern but at the expense of more spurious flux out the ends of the pad. Therefore, there may be an advantage in minimising the size of core 14 but there is also a disadvantage.

In some pad embodiments each turn of both coils 17 has a generally rectanglar shape. Two opposing sides of this rectangle run across the direction of the ferrite bars 24 and the other two run parallel to the ferrite bars. We have found that when wires run close to the ferrite bars there is an increase in loss and those wires that run parallel to the ferrite bars should be kept approximately 10 mm from the ferrite to reduce this loss. In the flux pipe this is not possible and the wires have to be close to the ferrite bars as they cross them—but the ferrite strips are separated by air so that the losses are lower. In the end winding the situation is similar to the flux pipe, particularly if it is important to keep the unwanted leakage flux down by running ferrite to the ends of the coils. If the ferrite bars are truncated so that the end windings are in air to get a higher flux pattern then the end windings should be kept 10 mm from the ferrites.

The magnetic structures described herein can also be used to sense the presence and alignment of one structure with another, using a transmission structure and/or a receiving structure. In one example, for a parallel tuned receiver the extent of alignment (or misalignment) is detected by sensing the magnitude and/or phase difference of the short circuit current in one of coils 17 with respect to the other, or of coils 17 with respect to coil 22 For example in a parking situation with an electric vehicle a lot of power is not required so the receiving pick-up coils 17, 22 may be short-circuited at regular intervals and the short circuit currents in the coils 17 and 22, allowing for the phase of those currents, will give a good indication of the position of the coils with respect to the transmitter pad and thereby allow the position of the vehicle to be known so that the parking may be more precise. The alignment can be displayed to a user as the user is parking the vehicle, for example, so that the user can improve or optimise alignment. Similarly, in a series tuned receiver the extent of alignment (or misalignment) is detected by sensing the magnitude and/or phase difference of the open circuit circuit voltage in one of coils 17 with respect to the other, or of coils 17 with respect to coil 22.

Further Practical Considerations

In practice it is prudent to ensure that the voltage at the terminals of the pad does not reach unsafe levels. Therefore in some embodiments, capacitance may be added in series with the windings inside the pad to lower the inductance seen at the pad terminals and therefore control the voltage at these terminals to be within suitable limits (say 300-400V). Without this the terminal voltage could be several kV which is undesirable and potentially unsafe. Capacitance can be placed in series with the windings at nearly any convenient place with the apparatus. Thus in some embodiments one or more capacitors can be placed in series with the windings at the terminal points inside the pad housing, and in other embodiments capacitors can be distributed along the windings by breaking the winding into suitable sections with series capacitances in case the internal voltages on a single coil are ever too high.

A shielding plate may be used on the side of the core opposite the side on which the coils 17, 22 are provided in order to reduce any unwanted stray fields on the rear side of the transmitter or receiver apparatus. Such a plate may be made from aluminium and may thus also provide additional structural strength. As such magnesium could also be used to achieve a similar result and this has advantages in that it is extremely light and has a high internal damping so that under conditions of mechanical shock the ferrites within the pad are less likely to be damaged.

Figure 1:
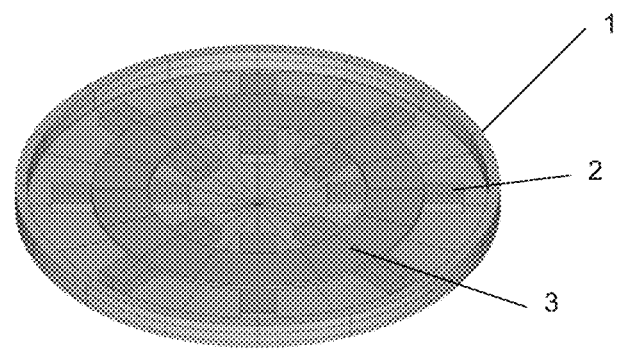
FIG. 1 is a perspective view of part of a known form of IPT power transfer pad.
Figure 2:
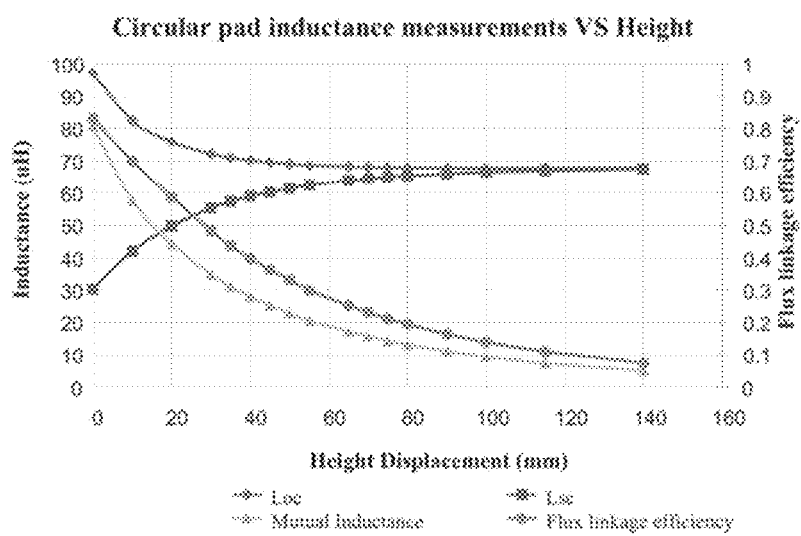
FIG. 2 is a graph of inductance measurements and flux linkage efficiency with respect to height displacement for a pad such as that of FIG. 1.
Figure 3:
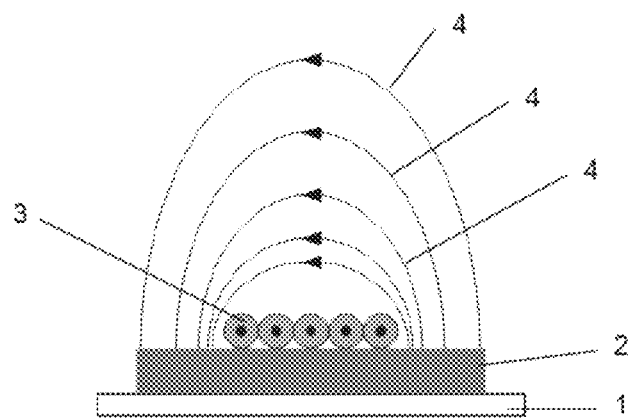
FIG. 3 is a diagrammatic elevation in cross section of a part of the pad of FIG. 1 showing flux lines.
Figure 4:
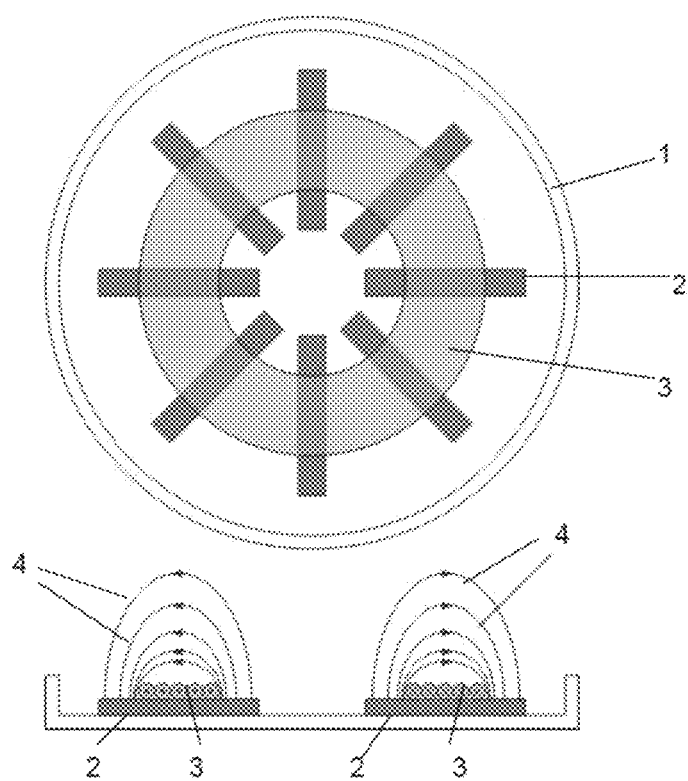
FIG. 4 is a plan view and elevation of a cross section of the pad of FIG. 1 showing flux lines.
Figure 4A:
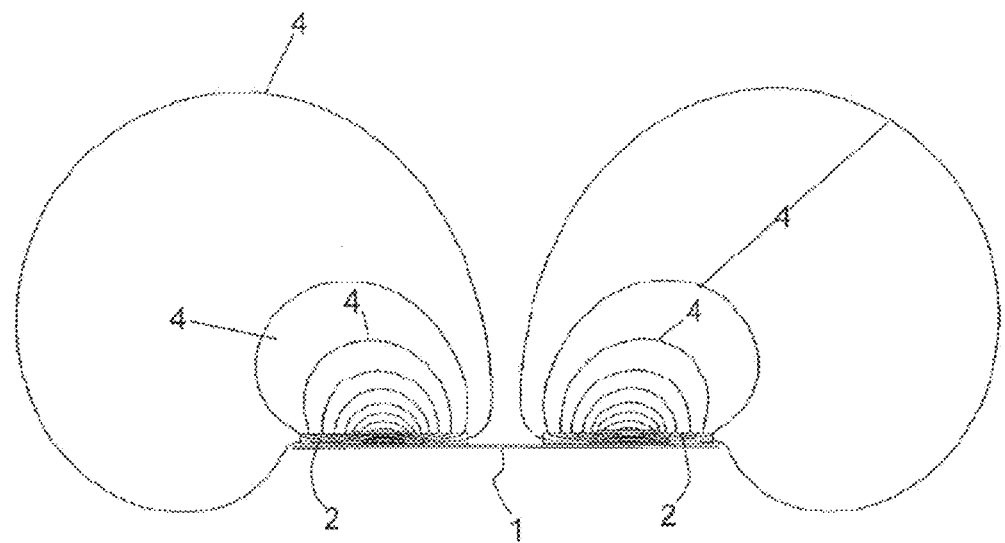
FIG. 4A is an elevation in cross section of a computer generated simulation of the magnetic field (indicated by flux lines) of the pad of FIG. 1.

It will also be seen that a transmitter pad could also include a further coil 22 which could be used to power a receiver such as the receiver of FIG. 1.

Therefore, the invention provides a low profile device, referred to herein as a pad, which can be used as a magnetic flux generator that can be used to generate useful flux a significant distance from the device. The device can also be used as a receiver of flux to thereby produce electric energy from the received field. The ability of the pad to generate or receive flux over a significant distance is particularly useful for charging or energising an electric vehicle.

The entire disclosures of all applications, patents and publications cited above are herein incorporated by reference.

Reference to any prior art in this specification is not, and should not be taken as, an acknowledgement or any form of suggestion that that prior art forms part of the common general knowledge in the field of endeavour in any country in the world.

Wherein the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

What is claimed:

1. A device for generating or receiving a magnetic flux, comprising:
    first and second substantially co-planar coils each defining a pole area, wherein a distance between one or more adjacent turns of the first and second substantially co-planar coils located in a region between the pole areas is different from a distance between one or more adjacent turns of the first and second substantially co-planar coils located outside of the region between the pole areas;
    a third substantially planar coil overlapping the first and second substantially co-planar coils; and
    a magnetically permeable core,
    wherein the first and second substantially co-planar coils and the third substantially planar coil are parallel tuned for resonance at a single frequency, and wherein the device is configured to be inductively coupled with a second device.

2. The device of claim 1, wherein the distance between the one or more adjacent turns of the first and second substantially co-planar coils located in the region between the pole areas is less than the distance between the one or more adjacent turns of the first and second substantially co-planar coils located outside the region between the pole areas.

3. The device of claim 1, wherein the distance between the one or more adjacent turns of the first and second substantially co-planar coils located in the region between the pole areas is greater than the distance between the one or more adjacent turns of the first and second substantially co-planar coils located outside the region between the pole areas.

4. The device of claim 1, wherein the one or more turns of the first and second substantially co-planar coils located in the region between the pole areas are more closely magnetically associated with the magnetically permeable core than the one or more turns of the first and second substantially co-planar coils located outside the region between the pole areas.

5. The device of claim 1, wherein the magnetically permeable core extends in a longitudinal direction between the pole areas, and wherein the magnetically permeable core is discontinuous in a transverse direction.

6. The device of claim 1, wherein each pole area comprises a center of a respective one of the first and second substantially co-planar coils.

7. The device of claim 1, wherein the device is configured to reflect an impedance onto an inductively coupled transmitter pad that compensates for a change in the inductance of the transmitter pad caused by the second device.

8. The device of claim 1, wherein the device is configured to have an uncompensated power that is substantially the same around a defined radius of misalignment of the device with an inductively coupled transmitter pad.

9. The device of claim 1, wherein the device is partially series compensated to compensate for variations in alignment between the device and an inductively coupled transmitter pad.

10. The device of claim 1, wherein the magnetic core of the device is configured to be longer, in a direction extending from a center of one of the first or second substantially co-planar coils to a center of the other of first or second substantially co-planar coils, than the magnetic core of a compatible transmitter pad.

11. The device of claim 1, wherein the two substantially co-planar coils are series wound from a length of wire.

12. The device of claim 1, wherein the third substantially planar coil overlaps the pole areas of the first and second substantially co-planar coils.

13. The device of claim 1, wherein the third substantially planar coil is wound from wire, and the third substantially planar coil has about the same number of turns as the first and second substantially co-planar coils.

14. The device of claim 1, wherein first and second two substantially co-planar coils are wound from a single length of wire.

15. The device of claim 1, wherein the first and second substantially co-planar coils are partially series compensated to compensate for variations in alignment between the device and an inductively coupled pad.

16. The device of claim 1, wherein the magnetically permeable core extends between the pole areas, and wherein turns of the first and second substantially planar coils that are located in a region between the pole areas are more closely magnetically associated with the magnetically permeable core than turns of the two substantially planar coils located outside the region between the pole areas.

17. The device of claim 1, wherein the third substantially planar coil is in spatial quadrature to the first and second substantially planar coils.

18. The device of claim 1, wherein the first and second substantially planar coils and the third substantially planar coil are wound from wire, and windings of the third substantially planar coil pass through a center of each of the first and second substantially planar coils.

19. The device of claim 1, wherein the first and second substantially planar coils are connected in series.

20. The device of claim 1, wherein the device is configured to have an uncompensated power that is substantially the same around a defined radius of misalignment of the device with an inductively coupled pad.

* * * * *